(12) United States Patent
Boemi

(10) Patent No.: US 11,522,728 B2
(45) Date of Patent: Dec. 6, 2022

(54) POE SYSTEM FOR THE DISTRIBUTION OF HIGH VOLTAGE POWER

(71) Applicant: Electrical Engineering Solutions Pty Limited, Kenthurst (AU)

(72) Inventor: Norman Boemi, Kenthurst (AU)

(73) Assignee: Electrical Engineering Solutions Pty Ltd, Dural (AU)

( * ) Notice: Subject to any disclaimer, the term of this patent is extended or adjusted under 35 U.S.C. 154(b) by 0 days.

(21) Appl. No.: 17/370,079

(22) Filed: Jul. 8, 2021

(65) Prior Publication Data
US 2021/0336807 A1 Oct. 28, 2021

Related U.S. Application Data

(63) Continuation of application No. 17/128,391, filed on Dec. 21, 2020, which is a continuation-in-part of application No. 16/636,462, filed as application No. PCT/AU2017/000160 on Aug. 4, 2017.

(51) Int. Cl.
| | |
|---|---|
| *H04L 12/10* | (2006.01) |
| *H01R 13/6581* | (2011.01) |
| *H01R 24/64* | (2011.01) |
| *H02J 9/06* | (2006.01) |
| *H02M 3/315* | (2006.01) |
| *H01R 107/00* | (2006.01) |

(52) U.S. Cl.
CPC ......... *H04L 12/10* (2013.01); *H01R 13/6581* (2013.01); *H01R 24/64* (2013.01); *H02J 9/061* (2013.01); *H02M 3/315* (2013.01); *H01R 2107/00* (2013.01)

(58) Field of Classification Search
CPC ....................................... H04L 12/10
USPC .......................................................... 713/340
See application file for complete search history.

(56) References Cited

U.S. PATENT DOCUMENTS

| | | |
|---|---|---|
| 8,599,536 B1 | 12/2013 | Jorgensen et al. |
| 2005/0044431 A1 | 2/2005 | Lang et al. |
| 2006/0186739 A1* | 8/2006 | Grolnic ................... H04L 12/44 307/64 |

(Continued)

FOREIGN PATENT DOCUMENTS

| | | |
|---|---|---|
| GB | 2448443 | 10/2008 |
| WO | 2017054030 | 4/2017 |

OTHER PUBLICATIONS

Int'l Search Report and Written Opinion for Int'l Patent App No. PCT/AU2017/000160, dated Nov. 17, 2017, 11 pages, Australian Patent Office, International Bureau.

*Primary Examiner* — Santosh R Poudel
(74) *Attorney, Agent, or Firm* — Douglas J. Ryder; Ryder, Mazzeo & Konieczny LLC

(57) ABSTRACT

The present invention provides a system comprising PoE apparatus including midspans, switches and routers that can provide high powered PoE connections that enable the recovery of DC power in sufficient quantities that allow it to be converted to AC power by way of an inverter. The invention also provides a method for providing AC power, data and light to office workstations using a single PoE connection. The invention further comprises a common mode signaling system that operates independently of any TCP/IP signal transmitted through an Ethernet connection wherein said signaling system is adapted to communicate with and control PoE powered devices.

25 Claims, 18 Drawing Sheets

(56) References Cited

U.S. PATENT DOCUMENTS

| | | | |
|---|---|---|---|
| 2006/0238250 A1 | 10/2006 | Camagna et al. | |
| 2011/0235229 A1* | 9/2011 | Nguyen | H01T 4/08 |
| | | | 361/119 |
| 2012/0269484 A1* | 10/2012 | Peto | H01R 24/60 |
| | | | 385/76 |
| 2012/0271477 A1 | 10/2012 | Okubo et al. | |
| 2013/0201316 A1* | 8/2013 | Binder | H04L 67/12 |
| | | | 348/77 |
| 2014/0159510 A1* | 6/2014 | Gershfeld | H04N 5/63 |
| | | | 307/151 |
| 2014/0293994 A1 | 10/2014 | Pepe et al. | |
| 2015/0094872 A1* | 4/2015 | Huang | H04L 12/282 |
| | | | 700/297 |
| 2015/0163881 A1 | 6/2015 | Pederson | |
| 2016/0020858 A1 | 1/2016 | Sipes, Jr. et al. | |
| 2016/0028324 A1* | 1/2016 | Weatherspoon | H02M 7/5381 |
| | | | 375/257 |
| 2017/0068307 A1* | 3/2017 | Vavilala | G06F 1/3296 |
| 2017/0089557 A1* | 3/2017 | Ericson | F21S 8/04 |
| 2017/0188450 A1* | 6/2017 | Svensson | H05K 1/0215 |
| 2017/0194790 A1* | 7/2017 | Kim | H02J 13/0079 |
| 2017/0208658 A1* | 7/2017 | Yseboodt | H05B 47/18 |
| 2017/0250828 A1* | 8/2017 | Buchanan | H02J 3/02 |
| 2017/0351309 A1* | 12/2017 | Hartnett | H04L 12/10 |
| 2019/0277899 A1* | 9/2019 | Goergen | H04L 12/10 |
| 2019/0280895 A1* | 9/2019 | Mather | H04L 41/12 |

\* cited by examiner

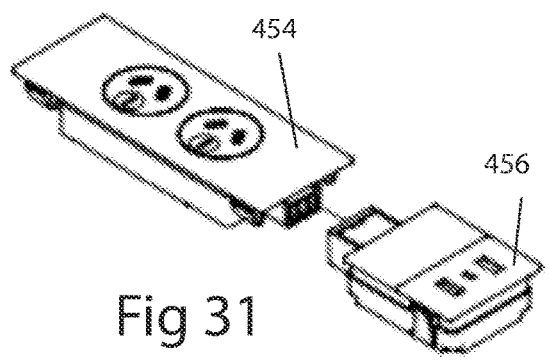
Fig 31
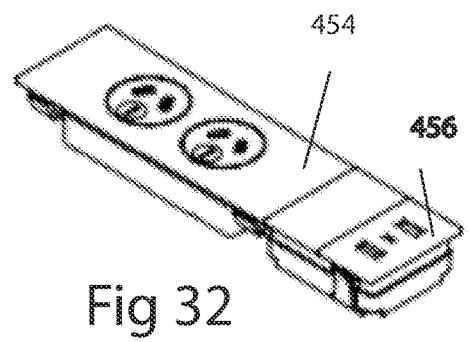
Fig 32
Fig 33
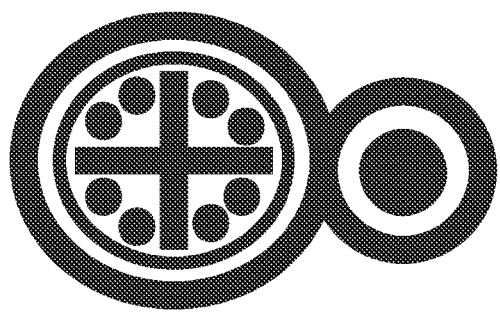
Fig 34
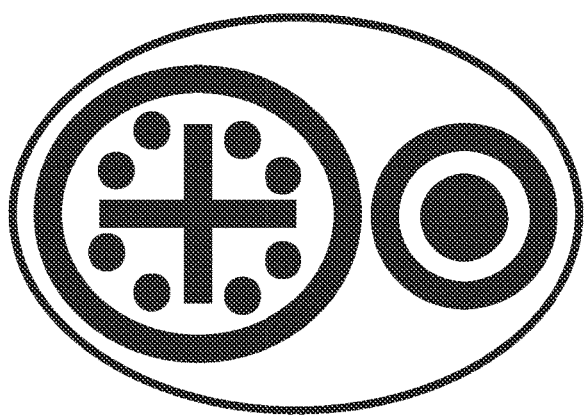
Fig 35
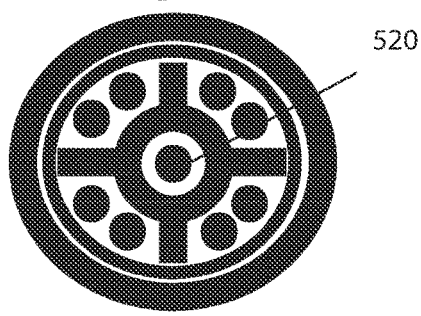
Fig 36
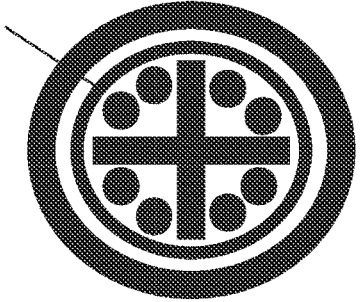

POE SYSTEM FOR THE DISTRIBUTION OF HIGH VOLTAGE POWER

BACKGROUND

It will be clearly understood that, if a prior art publication is referred to herein, this reference does not constitute an admission that the publication forms part of the common general knowledge in the art in Australia or in any other country.

The distribution and provisioning of power, data and lighting services in a building represents one of the most important stages in a buildings construction. Further such steps often occur on repeated occasions throughout a buildings life, particularly if the building is a commercial building that is "refitted" on a regular basis when new tenants are introduced, or when an existing tenant decides to alter the floor plan and utilization of a space.

A high proportion of the provisioning of power, data and lighting services in office fit outs is for the purpose of providing services to desks and workstations where office workers complete their tasks. In some cases, hundreds of workstations are required to be serviced on each floor. In conventional fit outs, each floor of a commercial office building has a distribution board from which a plurality of high voltage circuits connected to each circuit breaker of the distribution board. These circuits deliver high voltage (240V or 110V AC) for mains power points which are used by the workers at their workstations to power computers, monitors, printers etc. The circuits run along cable trays, catenary wire and conduits in the ceiling space or below the surface of a raised floor. They are connected to general power outlets in the workspace by way of electrical risers which provide access to below the floor, via umbilical cords extending down from the ceiling, or via walls and skirting boards in which general power outlets are located.

In addition to providing 240V AC/110V AC (which will hereafter be referred to as high voltage power) for general power outlets, high voltage power is also distributed from the distribution board for the powering of luminaires for the lighting of the office workspace.

It is a requirement in most countries that electrical work including the installation and removal of 240V AC/110V AC circuits and general power outlets be conducted by licensed and qualified, electricians. Finding licensed electricians can often lead to delays during the fit-out stage of construction as they are generally in high demand. Further, by virtue of the work required to redesign and redeploy the electrical circuits, cable trays, conduits, electrical risers, umbilical cords, general power outlets and lights when a change of use occurs, such a change can represent a huge disruption to the workers and the business. In many cases tenants prefer to move rather than risk the disruption that occurs during the rewiring of a floor of an office building. Even if the work is conducted over a weekend, the changes required, and the costs incurred in performing the works are very substantial and represent lost opportunities associated with the occupancy of the building.

By contrast, the provision of data cabling during office fit outs is less onerous. Firstly, as data cables, principally comprising Ethernet cables, run at extra low voltage (less than 60V DC), the rules surrounding the treatment of data cables, such as those set out in AS/NZS 3000:2007 and AS/ACIF S009:2013, are much more relaxed. For instance, it is not a requirement that data cabling is installed by fully qualified licensed electricians. Further, the cables themselves do not need to be encased in conduit or ducts or maintained on cable trays in the same way as high voltage cables.

In recent years there has been a movement to utilize power over Ethernet (PoE) for the powering of LED lights. However, the current standards of PoE do not provide sufficient power over the Ethernet connections to drive the plurality of lights necessary as in the case of a commercial office fit out. In Australian Innovation Patent Application 2016100103, which is incorporated herein by reference, the applicant disclosed the use of high powered PoE technologies to power LED lights featuring RJ-45 connections. However even accounting for the reduction in high voltage cabling that this innovation brought with it, there remained the issue of the remaining high voltage cabling used to provide general power outlets. The continued use of high voltage cabling represents a problem in terms of safety and inflexibility. It is desirous that the use of high voltage cabling in buildings is minimized, and more extra low voltage cabling is used instead, as it is safer and can be installed or removed by non-electricians. Further, the applicant in Australian Innovation Patent Application 2016100103 proposed a complicated and expensive method of controlling the connected LED lights using a NUC computer. It would be preferable to have a simpler and less expensive method of communicating and/or controlling connected devices that does not rely on high level communication protocols including TCP/IP.

The present invention, therefore, seeks to overcome or substantially ameliorate the shortcomings of the prior art.

BRIEF DESCRIPTION OF THE DRAWINGS

The following figures are provided to illustrate the nature of the invention in each of its aspects and preferred embodiments, namely:

FIG. 31 is a perspective view of a soft wring GPO module adjacent to an integrated USB charging module.

FIG. 32 is a perspective view of the modules of FIG. 31 that have been connected.

FIG. 33 is a cross sectional view of a Cat6A shielded cable that has been conjoined to an insulated earthing conductor cable by joining the two cables along their lengths.

FIG. 34 is a cross sectional view of a Cat6A cable collocated with an insulated earthing conductor cable by encasing both cables in a common sheath.

FIG. 35 is a cross sectional view of a Cat6A shielded cable with an extra insulated earthing conductor which can be used as a ninth conductor for providing an earth.

FIG. 36 is a cross sectional view of a Cat6A shielded cable with 8 conductors, wherein the foil shielding can be used as a ninth conductor.

MODES FOR CARRYING OUT THE INVENTION

Figure 1:
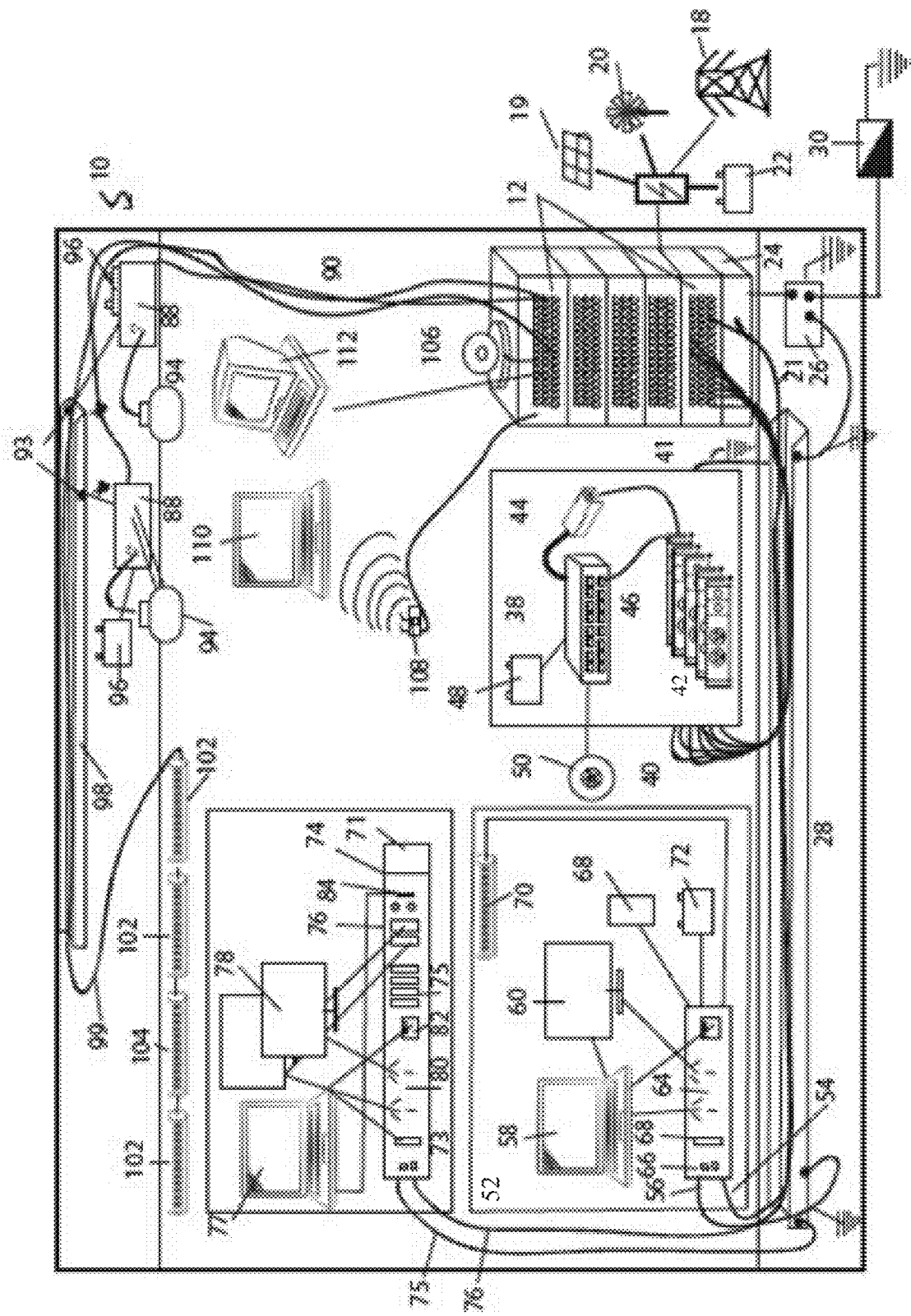
FIG. 1 is a schematic of the PoE system of the invention according to a first aspect of the invention.

As set out in the summary of invention, there are two main aspects of the invention. The first aspect resides in a number of power distribution devices which are capable of delivering high voltage AC to where it is required in a building by transmitting low voltage DC power over Ethernet cables then inverting the DC power at the destination using a power distribution unit (PDU) which produces high voltage AC power for use at the destination. As the PDU's can also deliver data in the form of Gigabit or 10 Gigabit Ethernet connections together with the AC power, the provision of a single Ethernet cable with a minimum of 100 W of PoE power would be sufficient to meet the basic needs of office workers today.

For example, a typical office worker's power consumption would be as set out in Table 1.

TABLE 1

| Device  | PC (Laptop)            | Monitor | USB Fan | VOIP Phone | Total   |
|---------|------------------------|---------|---------|------------|---------|
| Peak    | 60 W                   | 20 W    | 2.5 W   | 7 W        | 89.5 W  |
| Average | 45 W (with 30% charge) | 20 W    | 2.5 W   | 7 W        | 74.5 W  |

No currently ratified PoE standard is capable of delivering this level of power over a single PoE connection for reconversion to AC power in sufficient quantities to meet the needs of the average office worker. 802.3bt Type 4 more commonly known as PoE++ is capable of delivering 71 W at the powered device (100 W at the PoE source). PoE++ is not an as yet agreed and ratified standard. It is expected to become ratified in the coming years.

In Australian Innovation Patent Number 2016100103, which is herein incorporated by reference, the applicant discloses a number of non-standards compliant sources of high power PoE connections for use in powering RJ-45 equipped LED luminaires. It has been discovered by the applicant that even higher power PoE connections can be created and utilized provided certain safety measures are taken. These safety measures need to be taken as combining multiple high powered, low voltage DC PoE connections can result in a great deal of power passing through very thin conductors that are found in Ethernet cables. By virtue of the nature of the location of these cables in ceilings and underfloor access ducts, any overheating cables could lead to catastrophic fires.

In addition to apparatus for providing high voltage AC power by transmitting low voltage DC power, the present invention incorporates a novel communications and control method and apparatus for implementing the method. The method utilizes communication through the physical layer of the Ethernet connection and allows devices at both ends of a PoE connection to send and receive data comprising commands and/or data. As such the method is adapted to control the state of PDU devices powered by and connected to the PoE connection from the power source equipment (PSE). It is also adapted to receive data from PDUs that have been equipped with sensors such as temperature or light sensors.

The embodiments of the first aspect of the invention have been described together with the third aspect of the invention (comprising the fourth aspect of the invention). It should be noted however, that the applicant contends that each aspect is in itself novel and inventive and are the proper subject of the grant of letters patent. Accordingly, whilst the PSE and PDU devices of the present invention have been described with microcontrollers and suitably adapted injectors and splitters that facilitate communication across the physical layer of the Ethernet connection they are nonetheless useful without the communications capability.

Referring to FIG. 1 there is an overview of the PoE system 10. The PoE system 10 is comprised of PSE devices 12 which are a source of high powered PoE connections. The PSE device 12 may be a high powered PoE midspan device or it may be a PoE router or switch. Critically, the PSE device must be able to provide at least 100 W of DC power overlaid over an Ethernet data signal. Preferably there is provided over a single PoE connection at least 200 W of DC power and more preferably between 200 W and 600 W of DC power. The data signal that this power is overlaid upon may be 10 Base T, 100 Base T & 1,000 Base T (Gigabit) or 10,000 Base T. Indeed, any future standard for Ethernet data/power transmission that is compatible with the present invention is also claimed by the applicant to form part of the invention.

The PSE device are powered by high voltage 240/110V AC power from a power source 16 which is generally located close to the data cabinets in which the PSE devices would be located. In most cases power supplied by power source 16 is derived from the mains grid 18. It can, however, also be supplied by solar 19, wind 20 or battery 22. In the present invention, in order to provide a convenient and safe method of earthing remote PDU devices, an earthing system is provided which requires the proper earthing of the PSE 12 within a similarly earthed rack 24. The rack 24 is earthed via an earthing connection point 26 which is in turn connected to multiple earths including earthed cable tray 28 and distribution board 30. The cable tray 28 is in turn earthed by connecting it to conductors located on the building columns (not shown) which are also accessible in the area under the access floor 34 or above the ceiling 36.

There is also depicted in FIG. 1 Ethernet cables for carrying the PoE connections from the PSE 12 to the PDUs. The applicant has discovered that many types of Ethernet cables are unsuitable for carrying high currents associated with a combined DC power source of 200 W or more. In those cases, a high quality 23-gauge (or lower gauge cable) Cat6a shielded cable is the most appropriate choice for use with a high-powered PSE and a PDU. The cables manufactured and marketed by Panduit Corporation, an Illinois corporation from the USA are of very high quality and capable of handling up to between 200 W and 300 W per cable. In particular PFL6X04BU-CEG and PFL6X04WH-CEG manufactured by Panduit are suitable for implementation of the present invention as they do not suffer from excessive temperature rises in the core of the cable and accordingly their safety and data transmission capabilities are maintained as if they were running IEEE 802.3af, 802.3at or 802.3bt standards compliant PoE for up to 100 m span.

Figure 30:
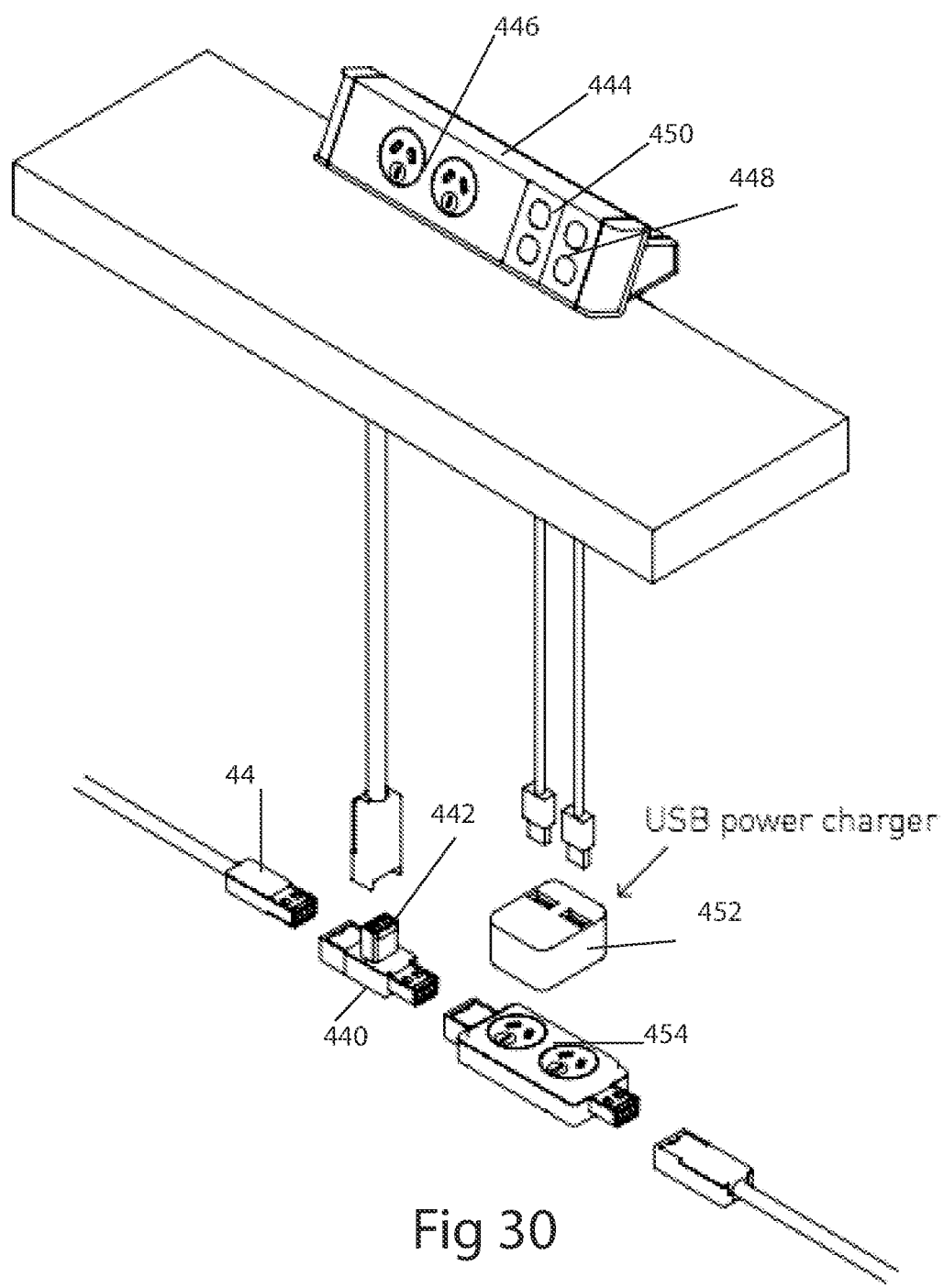
FIG. 30 is a perspective view of a soft-wiring desk module for providing GPO, USB and Ethernet connectivity using software wiring.

Multiple variations of PDU devices are shown in FIG. 1. The first is an 8 port PDU 38. This device shown in schematic form in FIG. 6. It receives 8 high powered PoE connections 40 which are then drawn into the device where the DC power carried by the 8 connections 40 is introduced into an inverter where it is converted into high voltage AC power for consumption by a group of workstations. The 8 Port PDU 38 has an earth connection 41 to the under-floor cable tray 28. As the 8 PoE connections 40 also result in their being 8 available Ethernet connections after the DC power is removed, it is preferable that the 8 port PDU 38 service 8 workstations so that each workstation is provided a combination of Ethernet connection and high voltage AC power 42 that is sufficient to meet their needs. The Ethernet and AC power can be reticulated in the 8-desk workstation in a number of ways. If the 8 Port PDU 38 has a starter socket 44 it can be connected to compatible soft wiring looms such as those manufactured by Electracom Pty Ltd trading as CSM Electracom or Schiavello Pty Ltd. The sorts of soft wiring options that are available are shown in more detail in FIGS. 30 to 32. In these figures the high voltage starter plug 44 is shown connecting to a variety of modular soft wiring accessories including T piece 440 for splitting off a high voltage connection 442 that is sent to a desktop module 444 which provides a plurality of general power outlets 446. Ethernet cables 46 can also be run to the workstation module to provide an Ethernet connection 450 for data connectivity. In addition to general power outlets the desktop module 444 also provides USB ports 448 for charging. These can be provided by a USB power charger 452 which are plugged into general power outlets 454 which are placed inline in the high voltage, soft wiring assembly. Alternatively, USB outlets can be provided for charging by the utilization of USB charging module 456 that connect inline with soft wiring general power outlets such as the integrated USB module LEC-USB2 from Schiavello Pty Ltd which are shown separated in FIG. 31 and connected in FIG. 32. These modules can be integrated into the workstation furniture together with outlets for the Ethernet connections 46. Indeed, furniture integrated with soft-wiring looms and connected to the 8 port PDU 38 is expressly contemplated as forming part of the present invention.

The 8 port PDU 38 also has a battery connection for connecting a rechargeable battery 48. The purpose of this battery is twofold. Firstly, it is used as a backup reserve of energy for when the PoE connections 40 become disabled or are disconnected. In such a case the battery supplies a small amount of reserve energy to power the device and its connected devices for between 15 to 60 minutes. The second purpose is to take into account that peak loads may exceed supply at certain times of the day or when devices are first turned on. Rather than increase the capacity of the system by introducing more PoE connections 40, the peak demand that exceeds supply can be met from the battery 48. In the present embodiment of a 1600 W 8 port PDU 38, an example of a suitable 300 Wh battery is, model CU-J615, AAPortable Power Corp of Richmond Calif.

The 8 port PDU 38 also has a sensor input for connecting sensors such as PIR 50. PIR 50 can be used to detect motion in the infrared spectrum. They are used to determine whether devices should be in a powered state. The PIR 50 is connected to the 8 port PDU 38 in two ways, firstly via dry contacts between the output of the sensor and the inputs of the PDU as well a power connection that provides low DC power for the sensor which is output by the PDU. Other alternatives to using a PIR to detect motion around the area in which the 8 workstations are located is to use light grids or rotating lasers to sense the presence of personnel, will output a signal to the 8 port PDU 38 to indicate to it that it should power up the contained inverter. Such sensors could be located under the desk such that when a person sits down, they activate the inverter so that high voltage AC power can be utilized by the desk's occupant. Other potential inputs that could be utilized are RFID readers which could be adapted to read the RFID chip contained within an employee's ID/access card. Further, as explained with respect to the communications protocol and particularly with the single port desk mounted PDU 52, a RFID reader could communicate the user information back to the building management system for recording where the worker has been working which is useful to know in agile workspace environments.

Turning to the single port desk mounted PDU 52 this is shown in FIG. 1 being connected to PSE 12 via PoE connection 54. It is also shown connected to underfloor cable-tray 28 as via earthing connection 56. The single port desk mounted PDU 52 has two AC devices connected to it, a laptop 58 and monitor 60 via a laptop charger and a monitor power supply (not shown). The laptop is also connected to an Ethernet connection 62 which is derived from PoE connection 54. The general power outlets 64 derive their AC power from an inverter contained within the device. The device also features a combined circuit breaker and residual current device which have test and reset buttons 66 on the device for testing and resetting the RCD once it has been activated. The device also features a USB charging port 68 for charging devices such as phones and tablet computers. The single port desk mounted PDU 52 also incorporates a sensor unit for connecting sensors such as PIR's as described previously with respect to the 8 port PDU 38. FIG. 1 depicts RFID reader 68 which is powered by and connected to PDU 52. In order to keep the AC power operating, the RFID reader 68 needs to be activated at regular intervals otherwise it turns the inverter off, and all AC powered equipment will not be able to operate. Also shown is luminaire 70 which is an LED powered by PoE power and supplied via RJ-45 jack as described in Australian Innovation Patent Number 2016100103. Switches for the luminaire 70 and AC devices are incorporated but not shown. An external battery pack 72 is also shown. It is used in the same way as battery 48. The battery is a 10.8v 4.5 Ahr NiMH-Battery such as Model No: TEB-BAT-PACK-DM161HD from Master Instruments Pty Ltd (www.master-instruments.com.au). It would last about 20 minutes when supplying 200 W of power to the PDU 54.

Also shown in FIG. 1 is a docking station PDU 74 which is connected to the PSE by way of PoE connection 76. It also has an earth connection 75. The docking station PDU 74 differs significantly from single port desktop PDU 52 in a number of ways. Firstly, it has onboard video which drives a plurality of digital video ports 76 which include HDMI and DVI. These are used to drive monitors 78 which are in turn powered by general power outlets 80. The power for the outlets 80 is derived from an internal inverter connected to a PoE splitter and where the AC power is output via an integrated RCD and circuit breaker. The Ethernet connection is also output via RJ45 jack 82. The docking station also has an on board a microcontroller that controls the input and output modules. Computers 77 such as laptops are powered via an adaptor connected to a source of DC power including USB-C port 84 which has USB 3.1 specifications that allow up to 100 W of power at 20V to be used to charge and power devices. It is connected for communications via a similar USB3.single port 73. A bank of USB2 ports 75 are also provided. In the docking station PDU 74 the battery is internal to the device and further, the device does not have contacts for connecting external sensors. Rather, an internal RFID reader 71 is included internally that is adapted to be activated by employee security/access cards and further, to monitor and report back the power consumption by reference to the identifications used thereby providing a means to generate an individual report for a person's energy consumption over time even if they swap desks as is common in hot desk environments. U.S. Pat. No. 8,990,469 for a portable electronic device docking station, which is incorporated herein by reference, discloses many of the components of the present docking station, and can be used as a guide.

Also shown in FIG. 1 are lighting PDU's 88. They are connected via PoE connections 90 and earthing bonds 93. They are connected to LED luminaires 92 and 94. The luminaires can in fact be any light fixture that can be powered by AC power, where said power is provided by the lighting PDU 88's internal inverter. In the case of luminaire 94, its only connection is via the general power outlet of lighting PDU 88. The on-board microcontroller is adapted to turn the inverter on and off thereby control the operation of the luminaire. Alternatively, in embodiments without an onboard microcontroller, the luminaire can be controlled by turning off the power to the PSE port via SNMP commands. With respect to luminaire 92 this is shown connected to the lighting PDU's 88 external DALI outputs as well as to the general power outlet. The DALI outlets allow signals to be sent to the luminaire in order to control its brightness and color and whether it is off or on. Lighting PDU's 88 also are connected to or contain internally, battery 96 and are also connected to a roof mounted ceiling tray 98 at earth bonding points 93.

There is also depicted in FIG. 1 a series of daisy-chained LED battens 102 and a maintained emergency luminaire 104 connected by a single PoE connection 99. Close variants have been described in Australian Innovation Patent Application 2016100103. The material differences only relate to the control and command technologies embedded within them which will be discussed later in the specification after that concept has been introduced.

Other devices that can be powered and connected to PSE 12 include CCTV camera 106 and Wi-Fi access point 108. Such devices do not require the high amount of power made available through the PoE connections. Notwithstanding that Wi-Fi base station 10 can be used to communicate with remote devices including PCs 110. Indeed, PSE 12 can directly communicate to PC's 112 via a directly wired Ethernet connections.

Signaling System

The forgoing was a description of various PSE and PDU apparatus useful in PoE systems for delivering power, light and data as services to building occupants. The following passages will focus primarily on a signaling system that can be implemented in the apparatus described previously.

The existing method for signaling between PSE and PDUs either involves simple, but limited, passive methods, such as, identification resistors or Layer 2 Ethernet protocols which, by their nature, require substantial accommodation within the particular technical standard (IEEE 802.3 af, at or bt).

The applicant proposes an alternate signaling method that can operate simultaneously alongside the existing ethernet protocol without any interference. It also offers an alternative mapping of PoE services such general purpose outlets or lighting points that are logically mapped according to their physical configuration. That is, control such as; lighting circuit dimming, remote sensing or General-Purpose Outlet (GPO) mains power control is based on which particular PoE port that device is connected to, therefore, negating the need to enter Internet Protocol (IP) addresses for every PoE component that is to be connected to and controlled by the system.

The present signaling system is designed to operate on existing 10 Base T, 100 Base T & 1,000 Base T (Gigabit) as well as 10,000 Base T (10 Gigabit) Ethernet systems with no interference to the high-speed differential signaling (transverse signaling) of the data.

In existing PoE systems unused pins (in the case of 10 Base T & 100 Base T) are often used to carry a steady direct current signal from the PSE to the PDU. In the case of 1,000 Base T (Gigabit) and 10,000 Base T (10 Gigabit), as well as many 10 Base T & 100 Base T PoE applications, these direct current signals are superimposed onto the differential signal in a common fashion. In other words, a DC signal is injected onto the ethernet cable by providing a high-current path to both sides of the differential signal. In this scheme, half the DC injected signals are fed from the positive terminal of the PSE power supply (rectifier) and the remaining half are fed from the negative half of the power supply.

The common-mode (longitudinal) control signal of the present invention is injected in a similar way to which the DC signal is injected in the Power.

Source Equipment (PSE). That is, the control signal, from a modem, is fed via transformer which is then superimposed onto the DC signal by creating a small ripple or perturbation (typically hundreds of millivolts in amplitude) of the DC injected signal. This signal is in turn recovered from the Power Distribution Unit (PDU) via a similar transformer and feed in modem.

Figure 2:
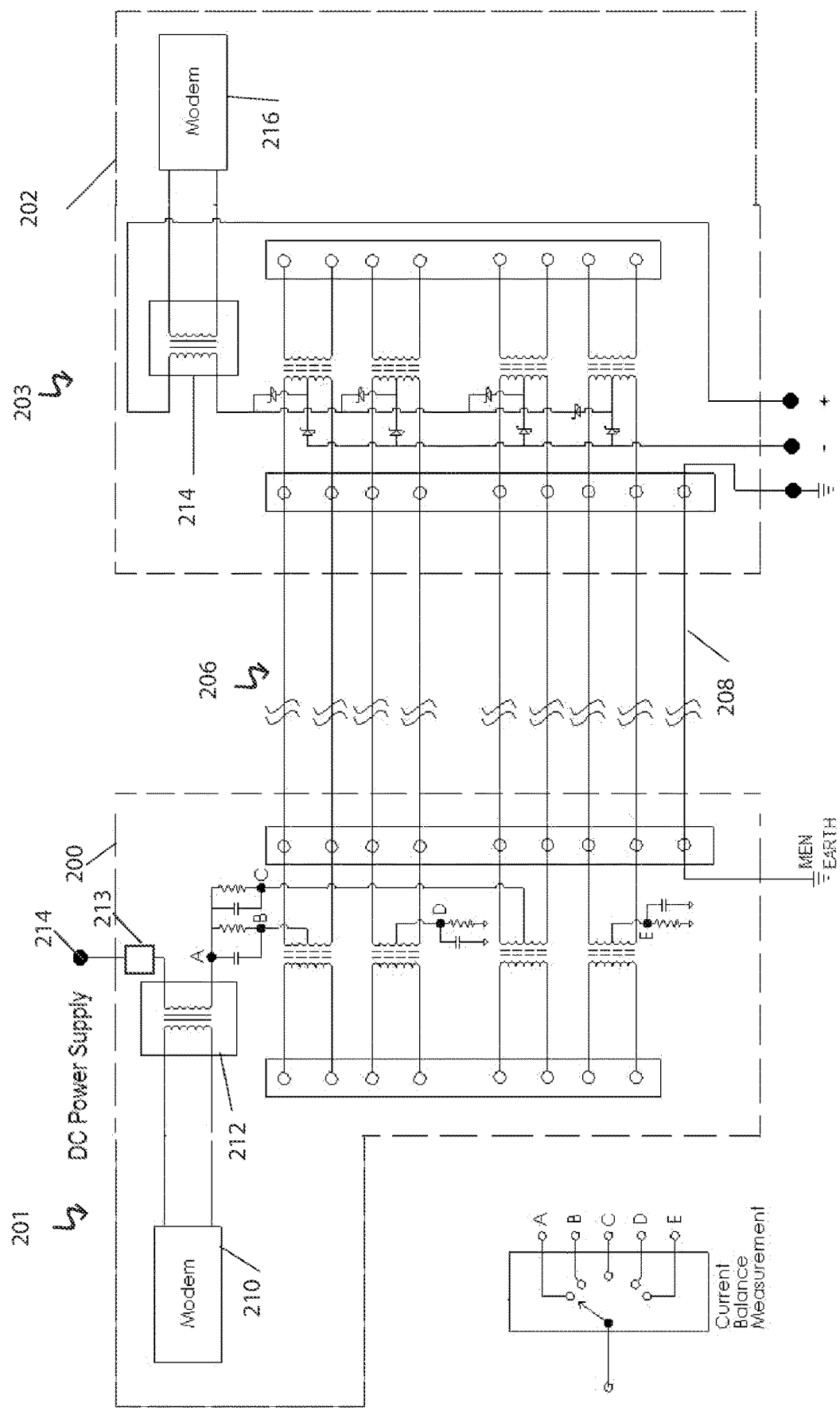
FIG. 2 is a schematic of a PoE injector and PoE splitter spanned by a PoE connection.

The forgoing is best explained by reference to FIG. 2 in which there is shown an example of an electrical construction of a PoE interface as it would typically be implemented to provide the desired signaling capability between PSE and PDU. The figure depicts PoE injector 200 that forms part of the PSE 201 and PoE splitter 202 that forms part of the PDU 203. FIG. 2 further depicts a single Ethernet Cat6a shielded cable 206. It should be noted that the figure shows the cable 206 includes 9 total conductors, including are four twisted pairs (which are commonly found in all Ethernet cables) and conductor 208. Conductor 208 will be referred to in subsequent passages that deal with the issue of earthing. Suffice for present purposes that the ninth conductor does not play any part in the signaling system of the present invention. In this figure the signal from modem 210 is fed into a transformer 212 whose secondary is used to perturb the direct injected current which is supplied by the DC power supply 214. An overcurrent protection device 213 (such as, Little-Fuse model RXEF300) has been placed in the power supply to protect the system in the case where the PDU attempts to draw excessive current from the PoE Ethernet connections.

Also referring to FIG. 2 the introduced signal is recovered from the by the transformer 214 which is then demodulated by modem 216. In both the PSE 201 and PDU 203 side of FIG. 2 the method of direct current and modem common-mode (longitudinal) signal injection is achieved by way of tapped ethernet transformer. Whilst this approach is the most common method of implementing this longitudinal signal injection, it is not the only method.

Figure 14:
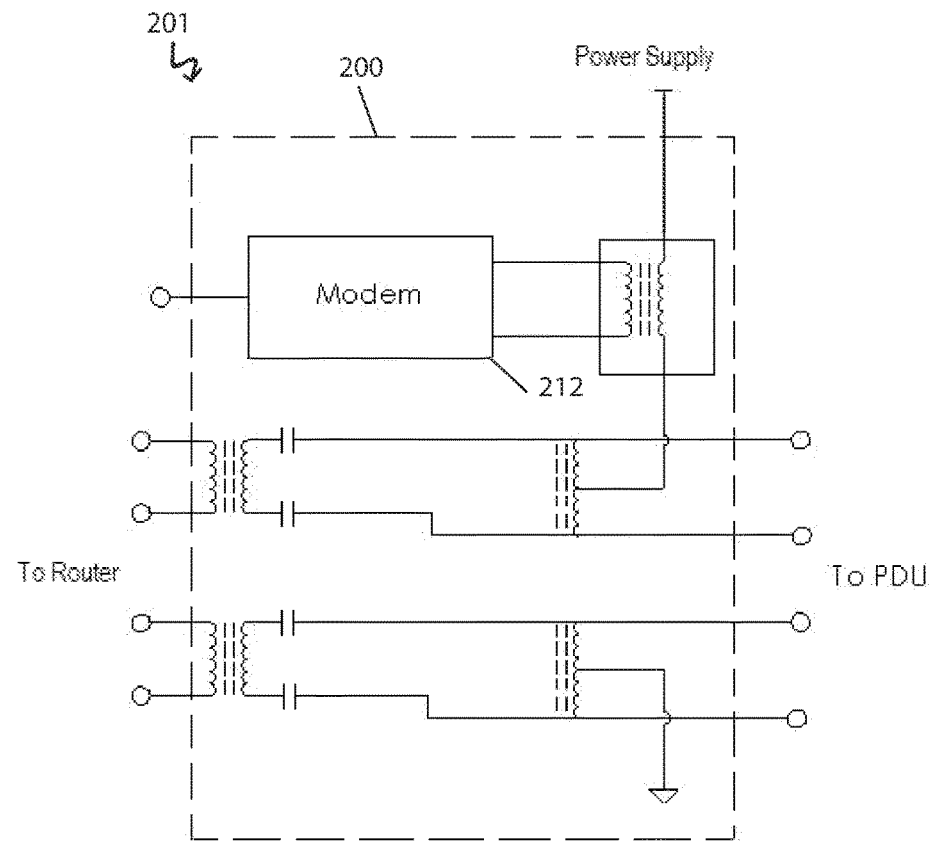
FIG. 14 is a schematic view of a PSE injector according to a further embodiment of the invention which uses an alternative method of common-mode injection of control signaling, using a tapped choke in which the signal is injected on the positive supply side.

Referring to FIG. 14 an alternative method of longitudinal signal injection is achieved by way of a tapped choke which is physically separate from the ethernet transformer. It is customary, although not mandatory, to also included DC (direct current) blocking capacitors in this configuration to avoid stray DC currents saturating the associated ethernet transformer. Note that the direct injected current in this approach is perturbed by injecting the modem signal into the positive rectifier supply.

Figure 15:
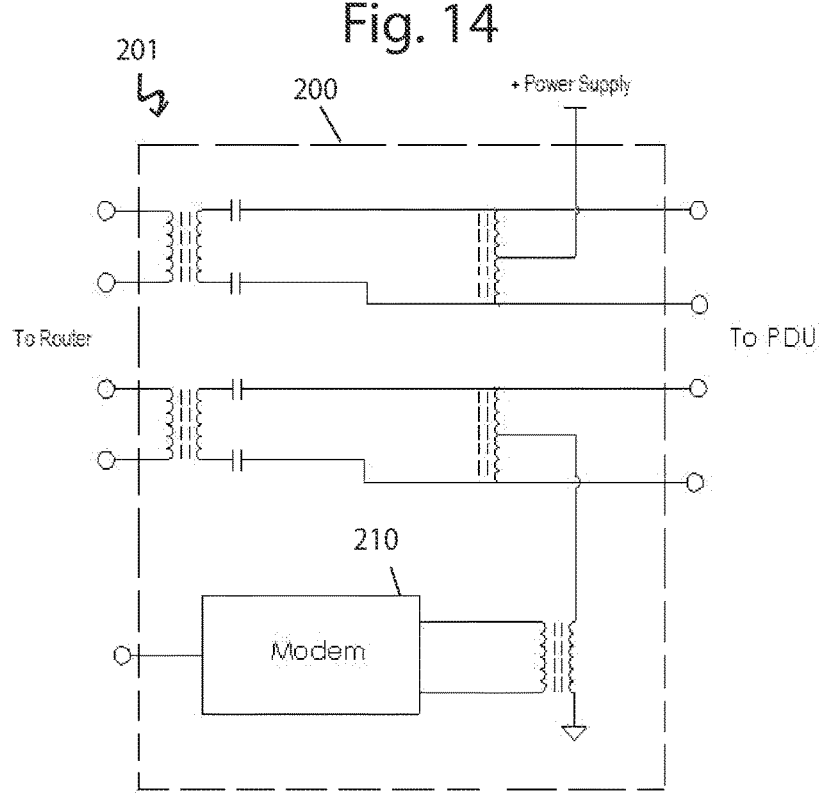
FIG. 15 is a schematic view of a PSE injector according to a still further embodiment of the invention in which a tapped choke is used to inject signal on the negative supply side.

Referring to FIG. 15 the method of longitudinal signal injection is again achieved by way of a tapped choke, but the perturbation signal is achieved by injecting the modem signal into the negative rectifier supply.

Figure 16:
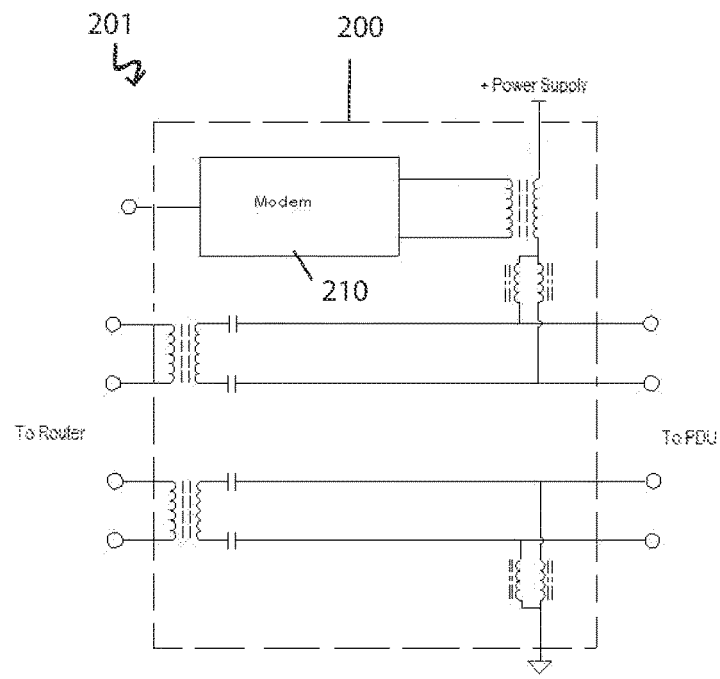
FIG. 16 is a schematic view of a PSE injector according to a still further embodiment of the invention in which two separate chokes feed either side of the differential lines and the signal is injected on the positive supply side.

Referring to FIG. 16, an alternative method of longitudinal signal injection is achieved by way of two separate chokes which again is physically separate from the ethernet transformer. Once again, it is customary, although not mandatory, to also included DC (direct current) blocking capacitors in this configuration to avoid stray DC currents saturating the associated ethernet transformer. Note that the direct injected current in this approach is perturbed by injecting the modem signal into the positive rectifier supply.

Figure 17:
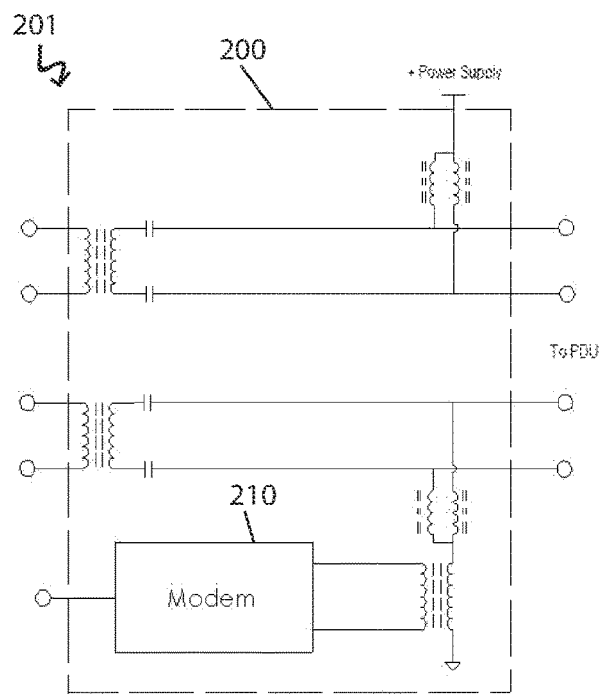
FIG. 17 is a schematic view of a PSE injector according to a still further embodiment of the invention in which two separate chokes feed either side of the differential lines and the signal is injected on the negative supply side.

Referring to FIG. 17, it shows the method of longitudinal signal injection is again achieved by way of a separate chokes, but the perturbation signal is achieved by injecting the modem signal into the negative rectifier supply.

PSE and PDU with Signaling

Figure 3:
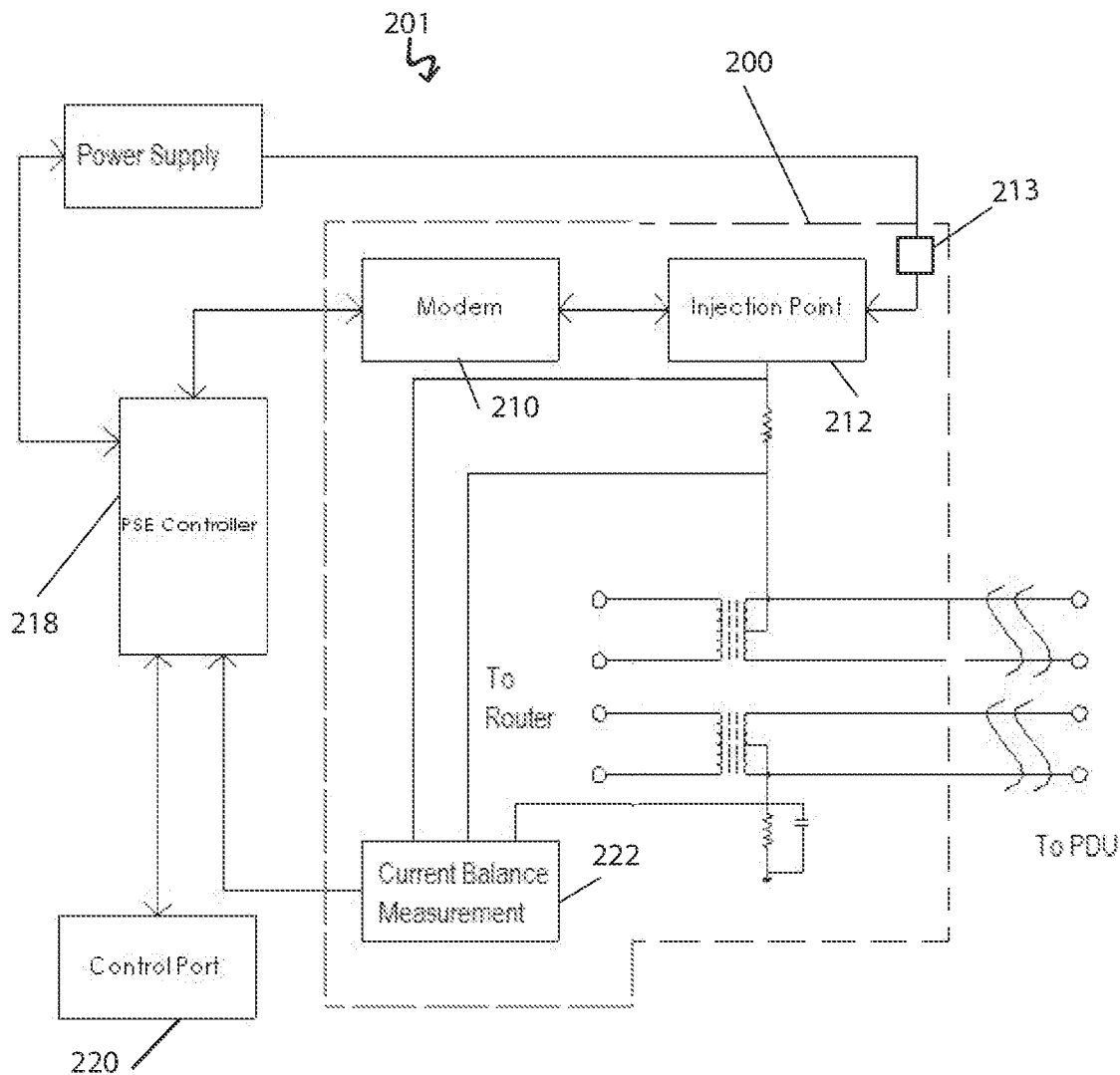
FIG. 3 is a schematic of a PoE power source equipment (PSE) of the PoE system.

Turning to FIG. 3 there is depicted a high-level, simplified (only two pairs of the Ethernet cable shown) block diagram of the PSE 201 major components including PoE Injector 200, modem 210 and transformer 212. The transformer 212 is connected to the modem 210 which sends various commands that are derived from PSE microcontroller 218 and in turn are generated in the PSE microcontroller 218. The demodulation of the injected longitudinal commands is performed in the PDU modem 216. However, as the communications link is bi-directional, the same is true in the reverse when the PDU is transmitting signals to the PSE. The PSE 201 can be configured and interrogated via a control port 220. The protocol for this management port is based on the industry standard Simple Network Management Protocol (SNMP).

Imbalances in the injected DC signal can occur due to faults in the CAT6a ethernet cable and/or connector terminations. To ensure that each of the terminals on the ethernet connector and each conductor on the CAT6a cables is passing its share of the injected current to the Power Distribution Unit (PDU) a current balance measurement has been implemented using multiplexor switch 222. The current imbalance is determined by measuring the voltage drops across the resistors in injector 200. The common of the multiplexor switch is feed to an analog-to-digital convertor in the PSE controller 218. If the current imbalance is only mild, then a warning can be issued via the control port 220 if the imbalance is large then the injected power may be reduced so that the system operates within safe limits.

Preferably, modems 210 and 216 use a frequency modulated carrier to encode data, otherwise known as Frequency Shift Keying (FSK). To facilitate full duplex communications each modem may operate on separate carrier frequencies. However, it is preferable to operate at half-duplex as this mode enables many more devices to be paralleled off each port. Also, if only half duplex communications are required then both modems could operate at the same carrier frequency. Whilst the modems preferably use a frequency modulation carrier(s), alternative modulation schemes are possible such as, phase, amplitude, pulse position, or Manchester coding. Alternatively, both the phase and amplitude may be modulated in schemes such as Quadrature Amplitude Modulation (QAM). As the amount of data transferred longitudinally across the link is only minimal, various low-baud-rate commercial modem standards are suitable, such as, Bell 103, Bell 202, or V22.

Protocols

Various commercial communications protocols are suitable for the low-speed longitudinal signaling. As low-cost micro-controllers often contain in-built Universal Asynchronous Receiver Transmitters (UARTs) an asynchronous byte-oriented protocol is preferred. However, this signaling could also be implemented using synchronous techniques and/or a bit wide protocol.

Preferably, asynchronous framing using a single frame version of the High-level Data Link Control (HDLC) as described in ISO 3309. The packet structure is given in FIG. 1. There are seven fields within the protocol, namely; Frame (start byte), Address (two bytes), Type (one byte), Length (one byte), Payload (variable length from 0 bytes to 65,535 bytes), CRC-8 (one byte), Frame (end byte).

Each message is framed with a start and an end byte using a unique byte, typically $7E_{hex}$ or 01111110 binary is typically used as a frame byte. Should this byte be required in the payload it needs to be bounded with an escape character. If the escape code is required in the payload an additional escape character is stuffed into the payload.

The advantageous features of this protocol include; a very simple and generic message structure, with error detection using a single byte Cyclic Redundancy Check (CRC-8), protocol level handshaking using the ACK (acknowledge) and NACK (not-acknowledge). Each message contains an address which enables up to 255 devices to be separately addressed on each port, thus enabling multiple devices to be either paralleled or even daisy chained onto each port (e.g., an inverter, a lighting controller, emergency light). It is important to note that the Ethernet (IEEE 802.3) interface does not normally support multi-drop configurations on its differential (transverse mode) signaling as the high data-rates need accurate line termination to the characteristic impedance of the cable, however, the common (longitudinal-mode) signaling operates at a much lower carrier frequency and is therefore much more tolerant of non-ideal line termination, thus enabling multi-drop configurations.

It is advantageous for the longitudinal signaling to be modulated at a low baud rate as this dramatically reduces the line termination requirements from short port cable runs of up to 100 meters. Whilst a peer-to-peer communications link has certain advantages, such as event-initiated communications it is more advantageous to use a master-slave protocol as the command data direction largely emanates from the PSE to the PDU. In a master-slave configuration the PSE initiating communications with the various PDU devices connected to each of the PSE ports.

To facilitate the various control functions that are initiated from the PSE a variety of message types are called for. Within the preferred implementation there are up to 255 message types available for each endpoint to implement comprehensive communication. A subset of these message types is given in Table 3.

TABLE 2

| Frame | Address | Type | Length | Command/Payload | CRC-8 | Frame |
|---|---|---|---|---|---|---|
| 1 Byte | 1 Byte | 1 Byte | 2 Byte | x | 1 Byte | 1 Byte |

TABLE 3

| Type | Description | Response Payload |
|---|---|---|
| 0 | Command/Data | Ack/(Ack, Data)/Nack/(Ack, Unknown Command) |
| 1 | Ack | Null |
| 2 | Nack | Null |
| 3 | Unknown Command | Ack/Nack |
| 4 | Node check (ping) | (Ack, pong)/Nack |
| 5 | Node response (pong) | Ack/Nack |
| 6 | Status? | (Ack, Status Response)/Nack |
| 7 | Status Response | Ack/Nack |
| 8 | Node type | |
| 9 | Node type response | Ack/Nack |
| A | Time Set | Ack/Nack |
| B | Broadcast for Nodes | Node Response (pong) |

A subset of the particular commands that control the various peripheral devices that are connected to the PSE is summarised in Table 5. These commands are focused on the controlling and monitoring the General-Purpose Outlets (GPOs), lighting circuits and sensors (such as, light curtains and passive infrared (PIR) movement sensors).

These commands are transported in the packet payload. An example, where the status of the invertor is requested is given in Table 6 with the associated response given in Table 7.

In another example involves PoE enabled lighting where message is sent to set the dimmer value to 50%, Table 8 with its associated response in Table 9.

TABLE 4

| Payload for Command/Response: | | |
|---|---|---|
| Payload Type | Payload Subtype | Data |
| 1 Byte | 1 Byte | 0-65533 Bytes |

TABLE 5

Command/Response payload list:

| Command/Response | Payload Type | Payload Subtype | Data Size |
|---|---|---|---|
| Light off | 0x01 | 0x01 | Null |
| Light on | 0x01 | 0x02 | Null |
| Dim to x | 0x01 | 0x03 | 1 Byte |
| Dim to x at rate | 0x01 | 0x04 | 2 Bytes First Byte: setpoint Second Byte: Rate |
| Max dim | 0x01 | 0x05 | 1 Byte |
| Min dim | 0x01 | 0x06 | 1 Byte |
| Inverter status req | 0x02 | 0x01 | Null |
| Inverter status res | 0x03 | 0x01 | 5 Bytes 1st Byte - V out 2nd Byte - I out 3rd Byte - Temp 4th Byte - Batt status 5th Byte - ELCB status |
| Inverter output on | 0x02 | 0x02 | Null |
| Inverter output off | 0x02 | 0x03 | Null |
| Sensor Read req | 0x04 | 0x01 | Null |
| Sensor read res | 0x04 | 0x02 | 2 Bytes |

TABLE 6

Example Inverter control (Inverter at address 1):
Message from PSE: Request Inverter Status

| Frame | Address | Type | Length | Payload | CRC-8 | Frame |
|---|---|---|---|---|---|---|
| 0xAA | 0x01 | 0x01 | 0x02 | 0x0201 | # | 0x55 |

TABLE 7

Response from PDU: Inverter Status

| Frame | Address | Type | Length | Payload | CRC-8 | Frame |
|---|---|---|---|---|---|---|
| 0xAA | 0x01 | 0x01 | 0x07 | 0x0301xxxxxxxxxx | # | 0x55 |

TABLE 8

Example light control (Light at address 2):
Message from PSE: Dim to 50%

| Frame | Address | Type | Length | Payload | CRC-8 | Frame |
|---|---|---|---|---|---|---|
| 0xAA | 0x02 | 0x01 | 0x03 | 0x010380 | # | 0x55 |

TABLE 9

| | | Response from Light: Ack | | | |
|---|---|---|---|---|---|
| Frame | Address | Type | Length | CRC-8 | Frame |
| 0xAA | 0x02 | 0x02 | 0x0 | # | 0x55 |

PDU

Having addressed the basic structure of a PSE including its PoE injector according to the present invention, and the protocols and commands that are capable of being transmitted over the link between PSE 201 and PDU 203 attention will now turn to the general structure of a PDU before turning to specific PDU embodiments depicted in FIG. 1.

Figure 4:
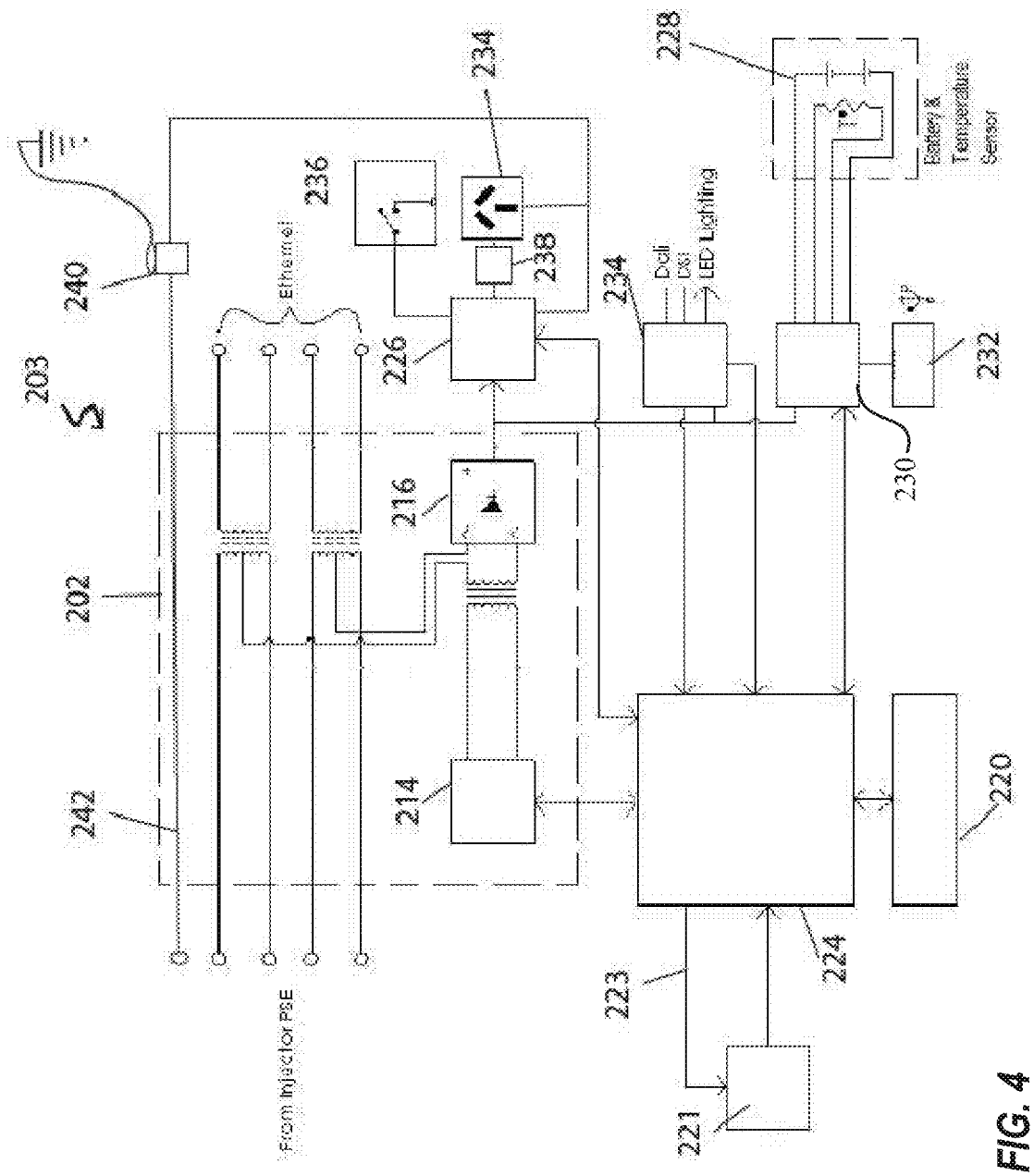
FIG. 4 is a schematic of a PoE powered distribution unit (PDU) of the PoE system.

Referring to FIG. 4 there is depicted a generalized PDU 203 containing a PoE splitter 202 which includes modem 214 and transformer 216. In a similar fashion to that which was described with respect to PSE 201, the PDU 203 has a PDU microcontroller 224 which is in communication with the modem 214 of PoE splitter 202. Received signals from the modem are transmitted to the PDU microcontroller 224. Control port 224 can also be used to communicate with PDU 203 locally via a technician's computer. However, in practice it would be rarely necessary to access this feature as the PDU and its connected devices can be controlled remotely via the signaling system of the present invention.

These core components form the base configurations of any PDU 203, particular for those that run on only DC power and that do not require the inclusion of an inverter such as luminaires 102 and 104 from FIG. 1.

However, for the majority of PDU's disclosed presently, they all have an inverter 226 which converts the DC power collected from the PoE connection by PoE splitter 202 and converts it into high voltage AC power for outlet via either general power outlet 234 or a compatible soft wiring starter jack (not shown). This allows PDU devices to be used to carry both power and data to workstations and pluralities of workstations which obviates the need to install high voltage cabling. RCD/circuit breaker 238 is installed so as to protect or reduce the risk of any end user being injured or killed through accidental electrocution. Switch 236 is utilized to turn the inverter on and off.

In certain embodiments further services and functions are performed by the PDU 203. These include providing a battery 228 for uninterrupted use of connected devices when the PoE connection becomes disabled. The battery also provides additional energy to accommodate peaks in demand that exceed supply provided by the PoE connection. Battery 228 has an integrated temperature sensor. The battery 228 is connected to charge controller 230 which regulates the flow of power between battery 228, USB charger 232 and inverter 226. USB charger 232 is provided so as to provide a USB port to charge devices. Various USB standards can be utilized including USB 3.1 which can provide 100 W of DC power. As discussed with respect to PDU 88 and 52 of FIG. 1, the PDU's can also drive lights via legacy command systems including DALI and DSI via the lighting controller 234. Lighting controller also outputs DC power for driving LED lights directly including dimming and color changing abilities.

PDU's 203 can also have sensors attached to them that make the use of them more energy efficient. For example, as described by reference to FIG. 1, sensors can be used to determine the proximity of human users and in the absence in the presence of any humans or movement, the inverter and/or any connected luminaires can be shut down. Many different types of sensors can be connected including PIRs, light grids, rotating lasers and RFID readers. In the case of RFID readers these would need to be integrated via a I/O function of the PDU controller 224 as opposed to the dry contacts that the other sensors can operate through. PDU also has a low voltage/low power output (5-10V/10 W) for powering sensors and other low voltage equipment such as VOIP phones which typically consume less than 10 W of power.

As mains voltage circuits need protective earth connections such as the Mains Earthed Neutral (MEN) system which has been adopted in most countries there is a need to provide a protective earth connection to each PDU 203. There are two methods available; the first requires that a separate earth conductor be run from an earthing stud 240 located on the PDU 203 case.

Alternatively, a protective earth can be run using either a modified CAT6a cable that includes a separate earthing conductor 242 (see item 520 in FIG. 35) or alternatively via a standard shielded cat6a cable via its foil shield (see item 522 in FIG. 36). An example of such a cable or cables are Cat6A made by Panduit Corporation including PFL6X04BU-CEG and PFL6X04WH-CEG. This ninth conductor, shown in FIG. 2 as item 208, is brought into electrical contact with both the external earthing plug and also the inverter 226, RCD/circuit breaker 238 and AC power outlet 234.

Figure 19:
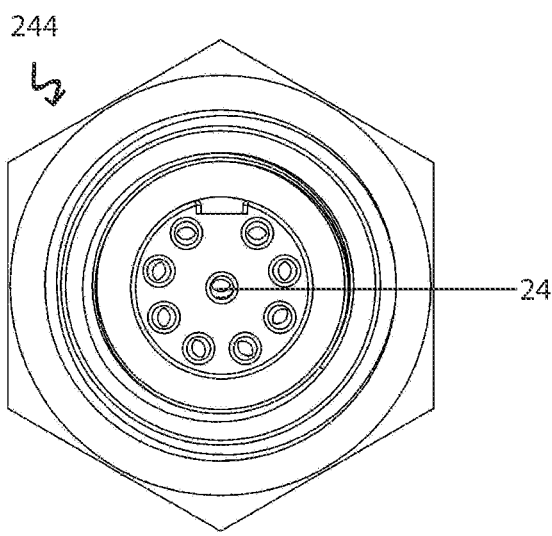
FIG. 19 is a front view of a modified M12 Ethernet socket.
Figure 20:
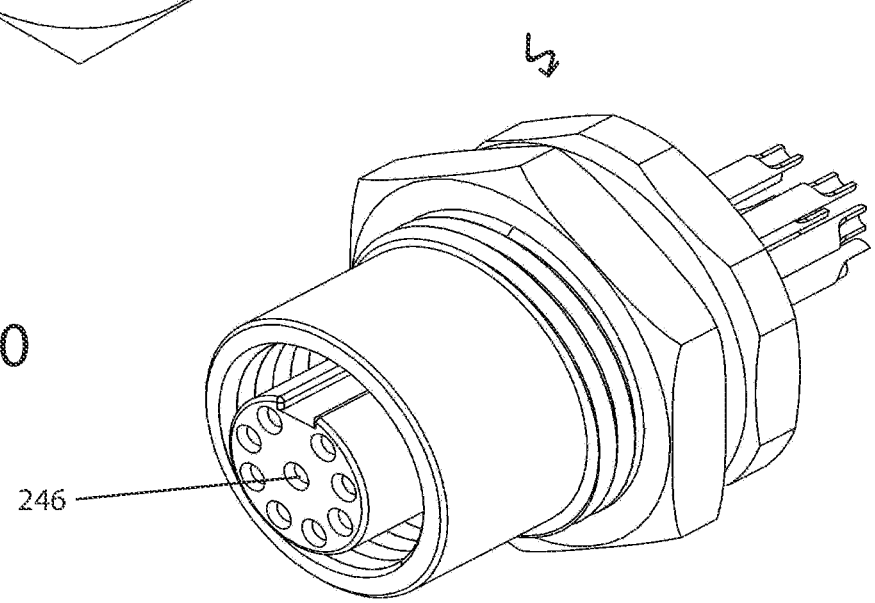
FIG. 20 is a perspective view of a modified M12 Ethernet socket.
Figure 21:
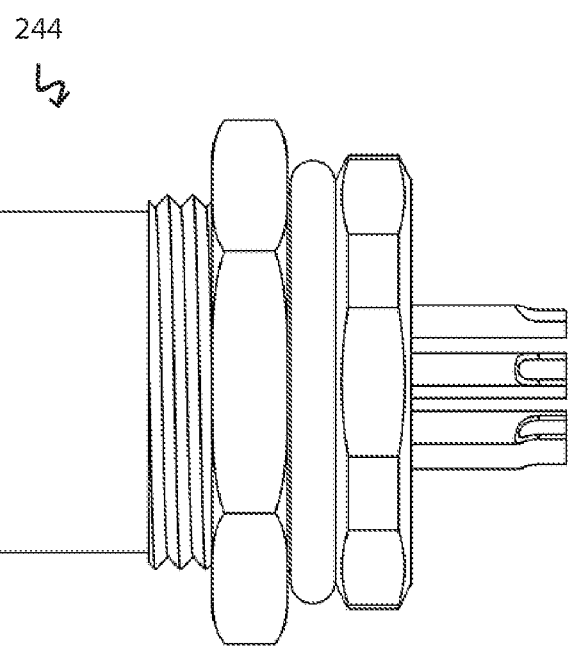
FIG. 21 is a side view of a modified M12 Ethernet socket.
Figure 22:
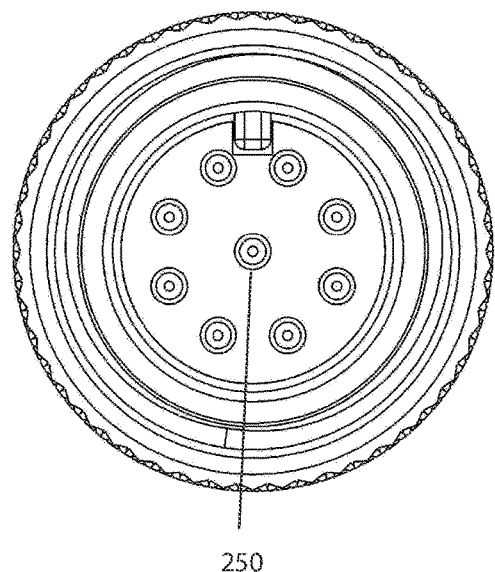
FIG. 22 is a front view of a modified M12 Ethernet jack.
Figure 23:
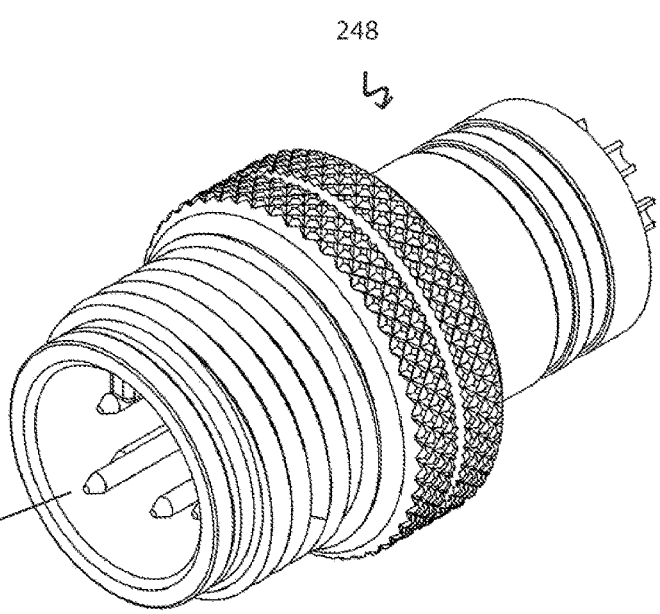
FIG. 23 is a front view of a modified M12 Ethernet jack.
Figure 24:
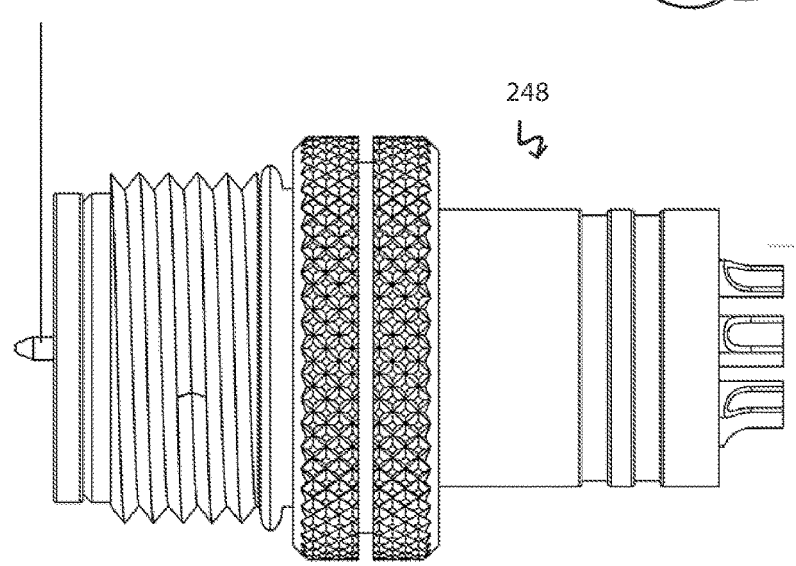
FIG. 24 is a front view of a modified M12 Ethernet jack.

There are two methods of using the ninth conductor 208 as a functional and protective earth. As a protective earth the connection to earth needs to be the made first before any of the active power carrying connections are made when inserting the plug containing the earth, and the last connection broken when removing the plug. To accommodate this additional conductor a modified M12 Ethernet plug 244 has been developed. An example of this modified M12 Ethernet bulk-head socket is shown in FIGS. 19 to 21. In these figures the additional earth receptor 246 can be seen in the center of the cluster, making 9 connection poles (8 for the 4 twisted data/power pairs and the remainder for the protective earth). Likewise, the associated inline plug 248 also has 9 pins shown in FIGS. 22 to 24. Note the extra-long earth pin 250 protruding past the other 8 signal/power pins seen in FIG. 24. The ninth conductor, whether it be a ninth conductor of a modified Cat6a cable or the shielding on current Cat6a cables, is connected to the ninth pin 250 which connects to ninth receptor 246. At the PSE end, the M12 connector 246 is bonded to the rack which is in turn bonded by way of metal screws to the multiply earthed rack.

In the alternative, if a modified M12 is not utilized, certain RJ-45 systems can be incorporated to provide earthing back to the rack which in turn is earthed back to multiple earths and distribution boards as shown in FIG. 1. These include the shielded copper cabling system made available by Panduit Corporation that include models PFL6X04BU-CEG and PFL6X04WH-CEG. Importantly the range includes: (i) shielded jacks including CJS6X88TGY that have 360 degrees conductive covers, (ii) shielded plugs TX6A, patch panel assemblies CPA72BLY and other accessories including bonding screws RGTBSG-C and common bonding network jumper kit RGCBNJ660P22. Using the shielding of the Panduit Cat6a 23-gauge cable makes it very easy to provide an earth to the PDU. In such cases where the requirements of a protective earth are met, separate earthing connections to external earthing lug 240 may not be necessary and can be avoided. Further all that is required to affect this grounding system is to use the appropriate cable, jacks and plugs and provide a connection at the PDU end between the components required to be earthed and the patch panel which is in electrical contact with the jacks outer covering which in turn are in contact with the plugs external metal conductors.

Reference is now made to FIGS. 33 and 34 which both depict CAT6a cables cross-sections that are co-located (FIG. 34) or joined directly (FIG. 33) with a dedicated insulated earthing conductor. These two embodiments will not typically be terminated through either an RJ45 or M12 plug as a single termination point but rather require the cable to be separated at the PSE end and the dedicated earth conductor connected to grounded or earthed fixtures such as the communications rack the PSE is mounted as shown in FIG. 1 by reference to connection 21 where the PoE connection is shown forking between the PSE 12 and the rack 24, using, for example "Structured Ground Common Bonding Network Jumper Kit", part #RGCBNJ660P22 made by Panduit Corporation. Other possible earthed fixtures such as cable trays, pipework, columns could also be used as an earthing target, and these need not be at the PSE end but anywhere in between the PDU and PSE.

Attention is now turned to inverter 226 and inverters generally for use in PDU devices. The typical equipment that is used in an agile workspace, namely; laptop computers, printers, VoIP phones, screens etc. (see Table 1) where the device power supply is based on switch mode technology, as such there is little need for a pure sinewave AC output voltage, as the first step in most switch mode supplies is to rectify and store the main signal. Preferably the AC output of the of a PDU inverter voltage would be either quasi-sinewave or even square wave as inverters built around these topologies are inherently more efficient that those that provide pure sinewave output.

The Alternating Current output from inverter 226 is feed into the Residual Current Device 238 which also includes an integrated over-current circuit breaker. If the current imbalance between the Active and Neutral lines generated in the inverter 226 does not exceed 30 mA (or similar regulatory safety value) and the current is less than the over-load value, then the RCD 238 will pass the inverter's power to the GPO 234.

It is preferable if the overcurrent protection element (circuit breaker) of the RCD 238 is rated slightly higher than the invertor's internal over-current limit so that a minor over-load will not trip the circuit breaker but rather only trip the invertor. It is preferable if the invertor's internal over-current protection would reset once the load fault is cleared. Even more preferable, is the use of an inverter circuit that also incorporates a thermal overload in case the thermal dissipation of the Power Distribution Unit (PDU) is compromised by restricted air supply or elevated ambient temperature. Fans and heatsinks are the most appropriate methods of minimizing the probability of this occurring. It is preferable that the inverter operates at an ambient temperature between 10° C. to 60° C. and that the energy conversion efficiency is at least 90% to reduce the need for active thermal management.

To reduce the risk of excessive and dangerous currents circulating back from the general-purpose output (GPO) connected circuit to the PDU and PSE the inverter should incorporate an isolated output. Apart from isolation, the inverters should also have the ability to report various performance measurements such as, output voltage, output current, temperature of main switching elements as well as the battery voltage. A large number of commercial inverters and un-interruptible power supplies come with these capabilities.

As mentioned previously, control port 220 operates using the Simple Network Management Protocol (SNMP). The interface for the control port can be either local technician's computer or alternatively this a centrally located management computer. An example of the packet that is sent and its response when an SNMP query, of the inverter status is generated is given below in Tables 9 and 10 respectively:

TABLE 10

Example Inverter control (Inverter at address 1):
Message from PSE: Request Inverter Status

| Frame | Address | Type | Length | Payload | CRC-8 | Frame |
|---|---|---|---|---|---|---|
| 0xAA | 0x01 | 0x01 | 0x02 | 0x0201 | # | 0x55 |

TABLE 11

Response from PDU: Inverter Status

| Frame | Address | Type | Length | Payload | CRC-8 | Frame |
|---|---|---|---|---|---|---|
| 0xAA | 0x01 | 0x01 | 0x07 | 0x0301xxxxxxxxxx | # | 0x55 |

The invertor status information is given in the response payload which summarised in the table excerpt below:

TABLE 12

| Inverter status res | 0x03 | 0x01 | 5 Bytes |
|---|---|---|---|
| | | | 1st Byte - V out |
| | | | 2nd Byte - I out |
| | | | 3rd Byte - Temp |
| | | | 4th Byte - Batt status |
| | | | 5th Byte - ELCB status |

Communication with the inverter enables each of the condition of the inverters in the various PDUs to be remotely interrogated by building management software.

Figure 25:
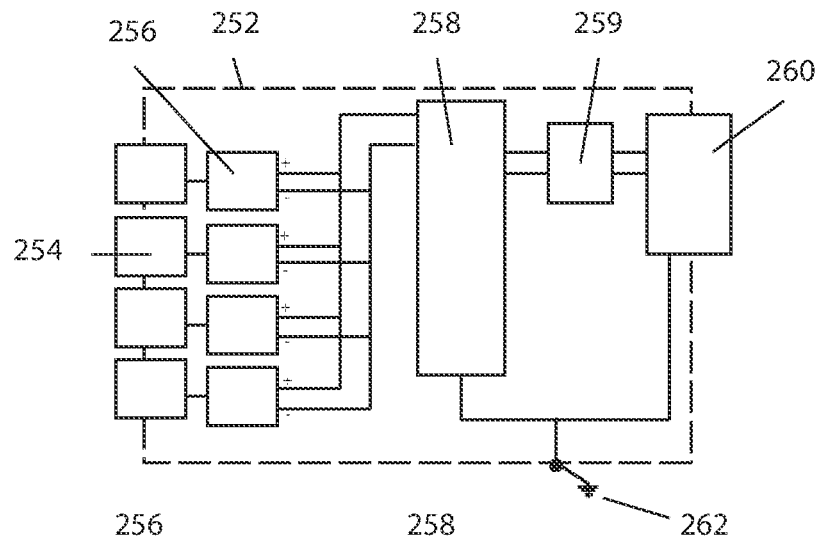
FIG. 25 is a schematic of a 4 port PDU in which the 4 sources of DC power are arranged in parallel.
Figure 26:
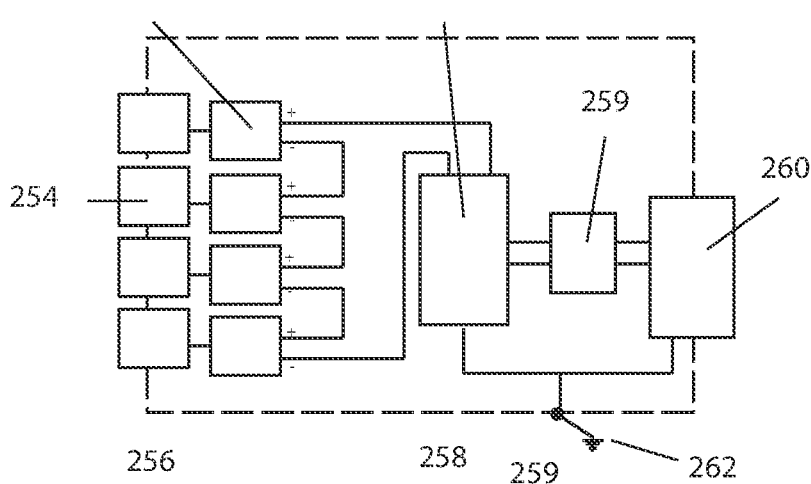
FIG. 26 is a schematic of a 4 port PDU in which the 4 sources of DC power are arranged in series.
Figure 27:
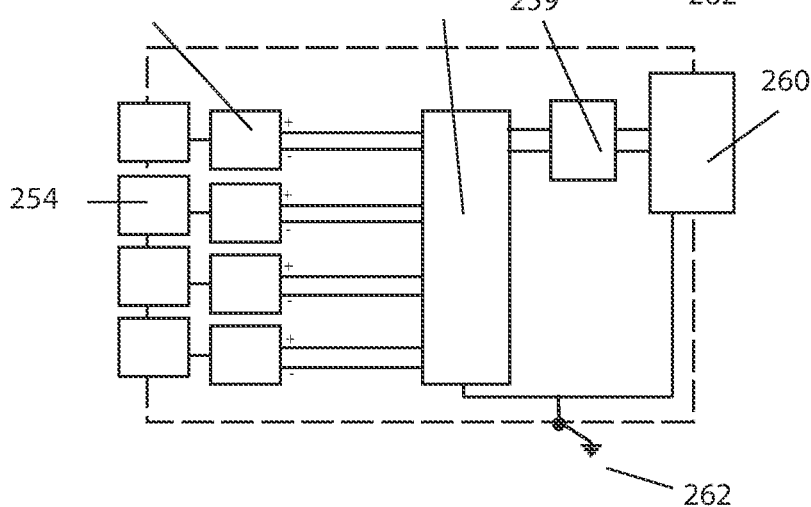
FIG. 27 is a schematic of a 4 port PDU in which the 4 sources of DC power are fed into a multi-input inverter.

Discussion now turns to FIGS. 25 to 27 which depict a number of alternative embodiments for a multi-port PDU. A multi-port PDU is one in which multiple PoE connections are converted into a single source of high voltage AC power. This is an excellent alternative to building bespoke high-powered injectors as off the shelf components can be utilized. However, there are significant drawbacks and problems with such an approach as will be noted below.

Common to all embodiments of the PDU are four Ethernet ports 254 which receive PoE connection and split it into data and power via splitter 256.

The obtained DC power is then in the case of FIG. 25 paralleled to form a high current, low voltage DC power source for feeding into inverter 258. The produced high voltage AC is then fed into is derived using a Tycon PoE splitter model PoE-INJ-1000-DINx. Together these four PoE ports can provide 480 W of power.

In the case of the circuit in FIG. 26, the circuit realization requires a PoE splitter than has an electrically isolated output (such as, Tycon PoE splitter model PoE-INJ-1000-DINx) in order to create a high voltage DC power source for supplying the inverter. The use of these devices isolates the outputs, which however result in additional losses and consequently more heat and lower efficiency.

Referring to FIG. 27, an alternative topology is proposed where the outputs from each of the PoE splitter 256 are independently feed into four separate inputs of a universal input invertor (such as, CyboEnergy—CyboInverter Model Ci-Mini-100Te). Whilst this approach has some merit it is not as efficient as the topology shown in FIG. 25 which is the preferred topology.

Notwithstanding that the topology in FIG. 25 is preferred over FIG. 26 and FIG. 27, there are significant shortcomings. In particular when using a multi-port PDU, it is imperative that the devices, including the PSE are constructed in a way that does not permit the power ratings of the cables utilized to be overpowered. This is a particular problem for multi-port PSE's when used with multiport PDU's. If precautions are not taken, the power that runs over 4 cables could suddenly be applied to a single cable, leading to overheating and fire which would be potentially catastrophic.

Figure 5:
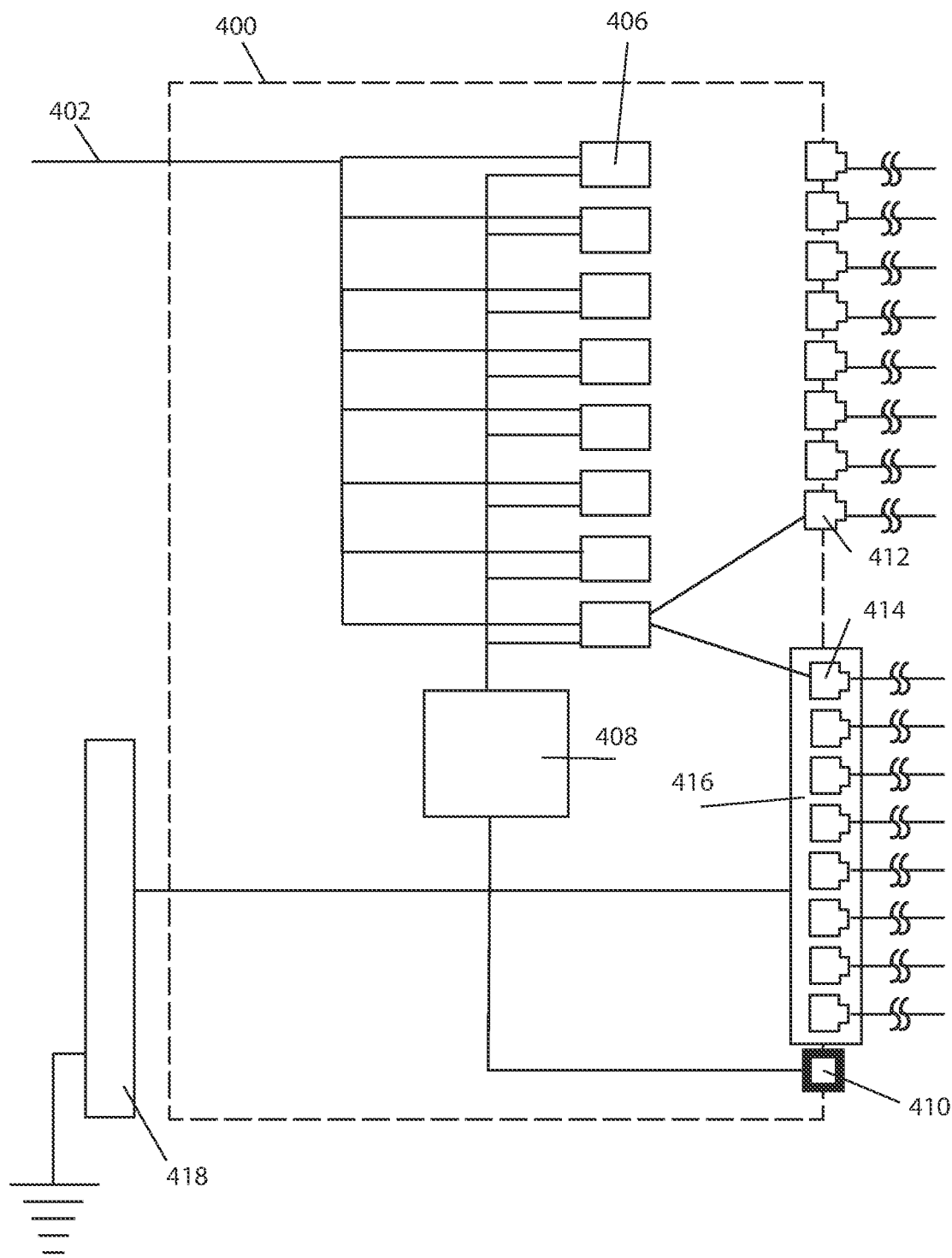
FIG. 5 is a schematic of a PoE PSE comprising a midspan with a plurality of PoE injectors.
Figure 6:
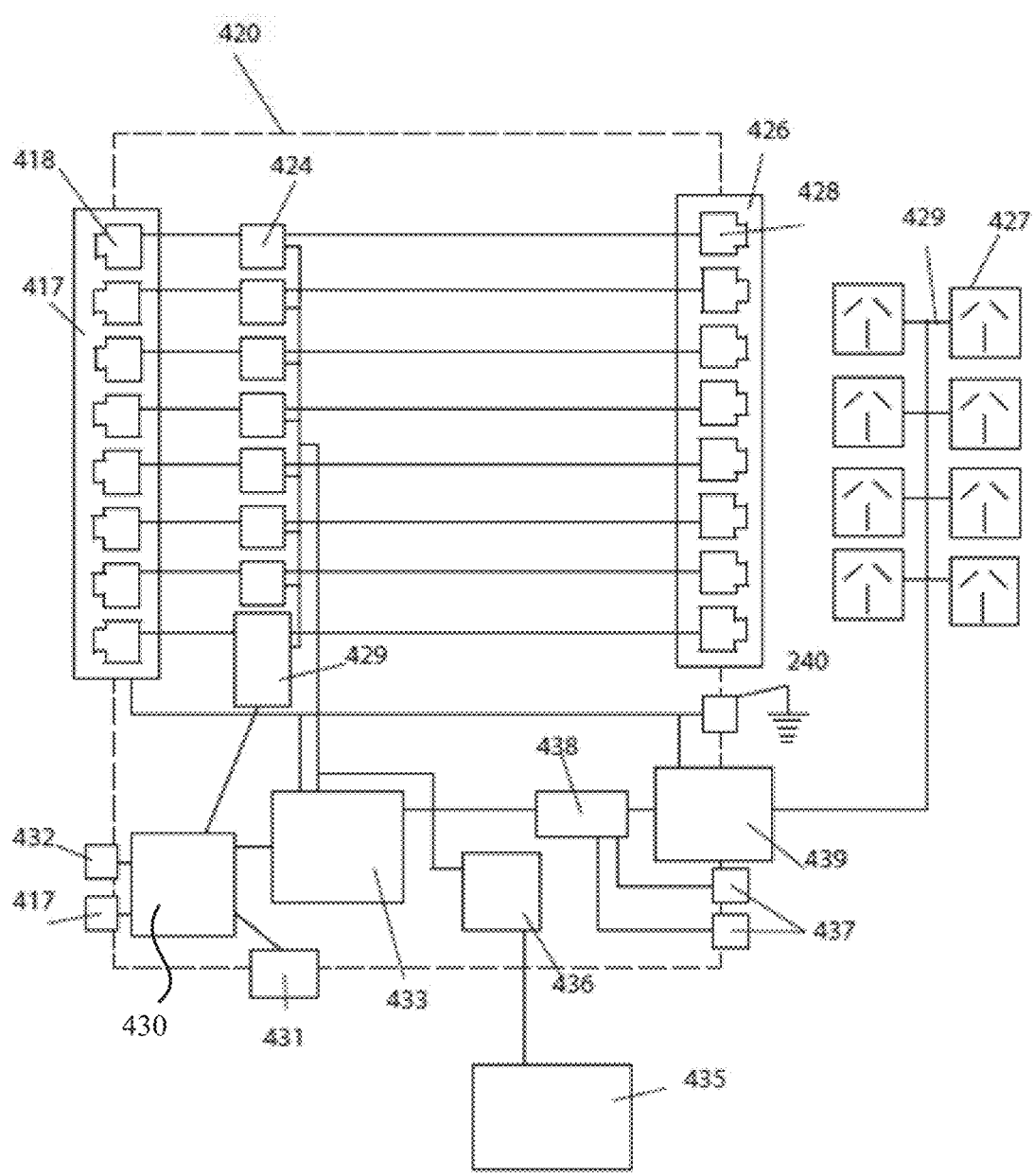
FIG. 6 is a schematic of an 8 port PDU of the PoE system.

Accordingly, newly proposed designs for a multi-port PSE and multi-port PDU have been developed are depicted in FIGS. 5 and 6 respectively.

Turning to FIG. 5 there is depicted a multi-port PSE or midspan 400 which is preferably made in a rack-mounted form factor. It is depicted with a single DC power supply 402 which could be supplied by many off the shelf DC rack-mounted DC power supplies including the Sentinel Power System SRS-48 manufactured in California by Newmar (www.poweringthenetwork.com) which outputs 1600 W DC at 57V over a single output. The DC power supply is applied to a bank of current limiting devices 213, which are also set out in FIGS. 2 and 3, which reside in each of the PoE injectors 406 which serve the purpose of putting an upper limit on the amount of current that is drawn from DC power supply 402.

The DC current is then passed into PoE Injectors 406 of the kind shown in FIGS. 2 and 3. These are in communication with PSE controller 408 which in turn is in connection with control port 410. PoE Injectors 406 also receive Ethernet signals from Ethernet port 412 and the combined PoE Ethernet and DC power is output as an PoE connection over Ethernet port 414. The patch panel 416 and Ethernet ports 414 are of the shielded/grounded variety previously described. These are in turn connected to rack 418 which is grounded and forms a path to earth for the ninth conductor in the cables connected to Ethernet ports 414. As described with reference to FIGS. 2 and 3, the injection of high-power DC signal of at least 100 W is required for the proper operation of the invention. Preferably at least 200 W is injected into the PoE signal. Even more preferably between 200 W and 300 W would be injected.

In the case where the injection voltage can be elevated from 57 VDC (the limit under IEEE802.3af,at,bt) to 120 VDC (the Extra Low Voltage limit under the ASNZS3000 electrical safety standard which being similar to many other regional standards) which equates to a PoE transfer power of 460 W per PoE channel.

In the case of 8 port PDUs a preferred 1600 W DC power budget would be required. Turning back to the need for power limiting devices located in injectors 406, if half (4) of the cables carrying 200 W were disconnected, without the current limiting devices, the four cables worth of power would begin to flow through the remaining cables. This would probably be sufficient to overheat the cable and cause it to catch fire. One way to avoid this is to employ a multi rectifier DC power supply that outputs a plurality of load limited DC power supplies such as MST Power's 488-27 which is a DC power supply with 9 hot swappable rectifiers which offer 8+1 redundancy and 8 individual sources of 200 W of DC power. If such a power supply is used, then the current limiting devices can be omitted, and each injector of PSE 400 would be individually fed 200 W.

Turning to FIG. 6 there is depicted an 8 port PDU 420. The 8 port PDU 420 features patch panel 417 which is in electrical contact with 8 ethernet jacks 418 which in turn into 7 PoE splitters 424 of the conventional type—with no onboard means of communication unlike those in FIG. 3; patch panel 426, Ethernet jacks 428 (shielded) of the sort previously described from Panduit Corporation. There is also provided one master PoE splitter 429 of the kind set out in FIG. 4 which is in communication with PDU controller 430/1/133. PDU controller 430 is also in communication with sensor input 417, 432 and control port 431. The DC power supply obtained from the PoE connections is taken and fed into the inverter 433. The outputs of the inverter 433 are high voltage AC power which is passed to RCD/circuit breaker 438, then on to outlet 439 which may be a soft-wiring starter module or it may be a general power outlet. Battery 435 is provided for backup power and to meet peak demands. This would include batteries 48 previously referred to in FIG. 1.

Figure 18:
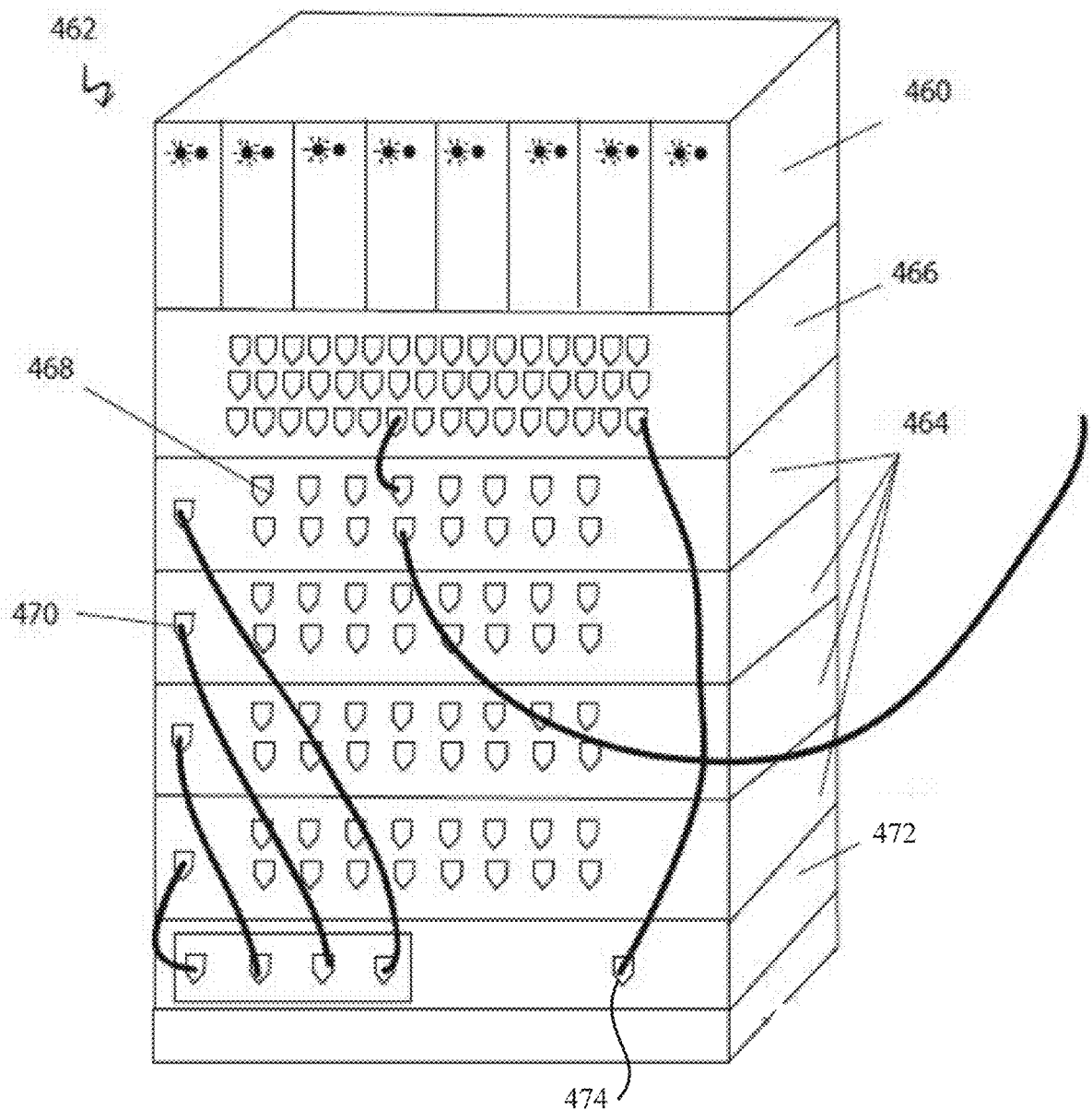
FIG. 18 is a perspective view of a rack mounted equipment of the PoE system.

Reference is now had to FIG. 18 which depicts a power supply 460 in a rack 462, a plurality of PSE 464 and a network switch 466. The PSE 464 devices each have 16 high powered PoE connections available in its 16 ethernet ports 468 as well as a single control port 470 on each midspan PSE 464. Each control port is in turn connected to hub 472 the master control port 474 is then patched into the switch 466. As each control port on each PSE 464 only controls those devices connected to that PSE, a method of controlling all connected devices includes accessing the master control port remotely via the switch. More specifically a computer on the network made available by switch 466 will be able to access the building management software which is served via a server in the network. The user accesses the software then makes the necessary changes or issues commands which the building management software interprets and turns into control commands sent to the PDU in accordance with the invention.

Figure 7:
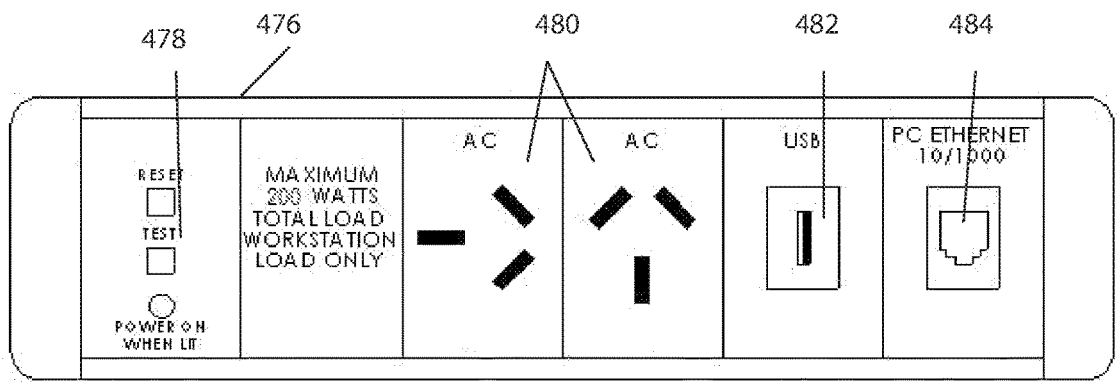
FIG. 7 is a front view of a desktop single channel PDU.
Figure 8:
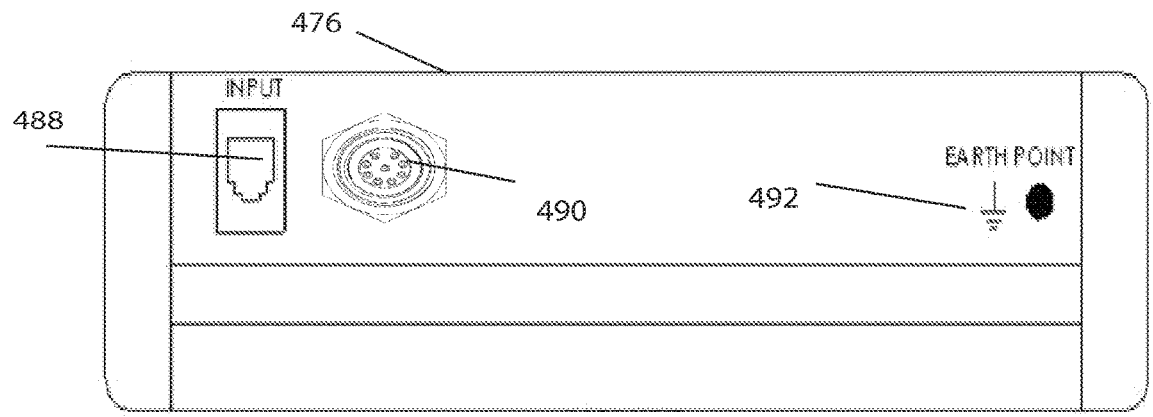
FIG. 8 is a rear view of a desktop single channel PDU.
Figure 9:
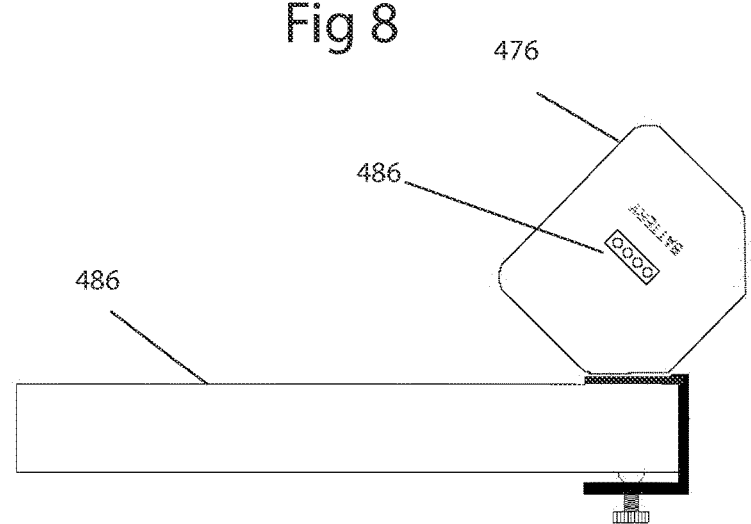
FIG. 9 is a side view of a desktop single channel PDU.
Figure 10:
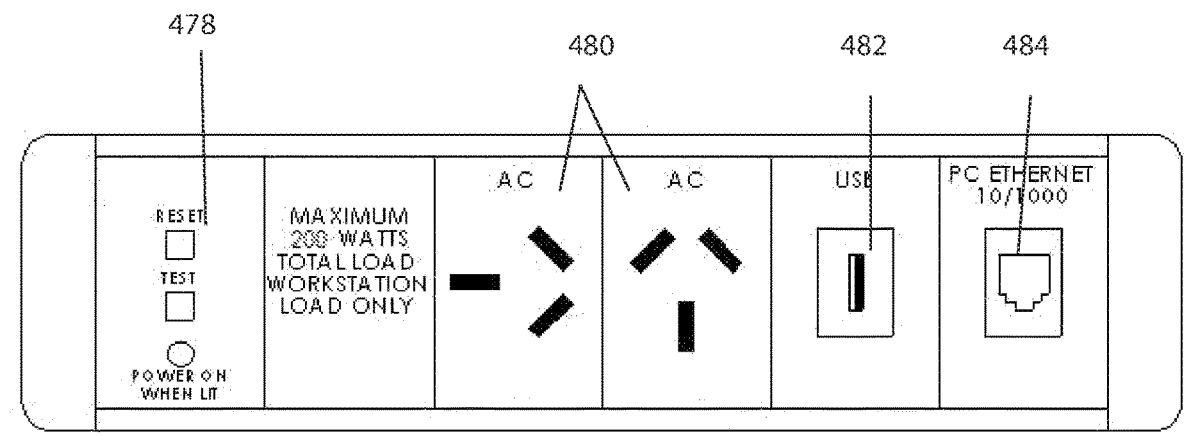
FIG. 10 is a front view of an alternate embodiment of a single channel PDU with lighting control functionality for desktop use.
Figure 11:
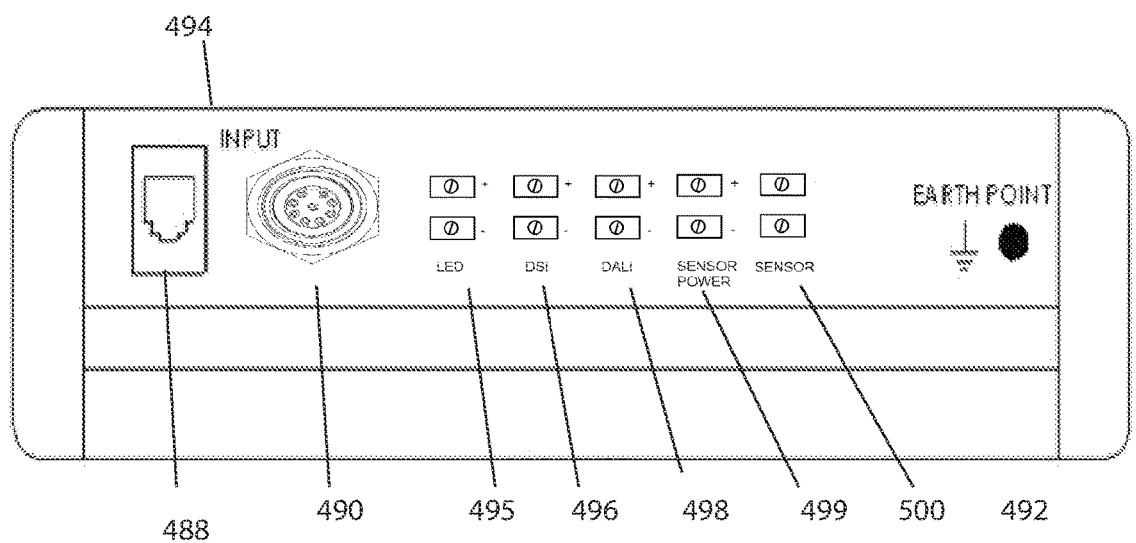
FIG. 11 is a rear view of an alternate embodiment of FIG. 10.

Reference is now made to FIGS. 7 and 8 and 9 which show various views of a workstation PDU 476 which was not depicted in FIG. 1. The principal difference between this embodiment and the workstation PDU 52 is that PDU 476 does not have any sensor inputs or ability to hook up external LED lights or control lights using DALI/DSI. The PDU 476 does, however, share test and reset buttons 478 associated with the RCD, two GPO's 480. A USB3.1 charging port 482 and 10/1000 Base T Ethernet port 484. The port for connecting a battery is shown as 486 on a side view in which the unit has been mounted on a desk 486. Also shown on the rear are modified M12 input 490 and RJ-45 input (shielded and conductive) 488 as well as an earth connection point. This embodiment of PDU 476 is most useful when there are no luminaires to drive and control and/or when a simple under-desk solution that can be used to complement and connect with soft-wiring modules and accessories. In such a case it is also possible to replace one or both of the GPO's with a soft-wiring starter jack.

By contrast the PDU 494 is consistent with the workstation PDU 52 from FIG. 1. Many of the ports are the same as the previous PSU however it should be noted that PDU 494 includes LED outputs 495 for driving external LED luminaires, DSI 496 and DALI 498 outputs for controlling luminaires that only respond to DALI and/or DSI commands. The PDU 494 also features a sensor power output 499 and sensor dry contacts 500. It should be noted that the sensor power output 499 is very low watts and low voltage. This makes it suitable to use as a source of power for low powered devices such as VoIP phones.

Figure 12:
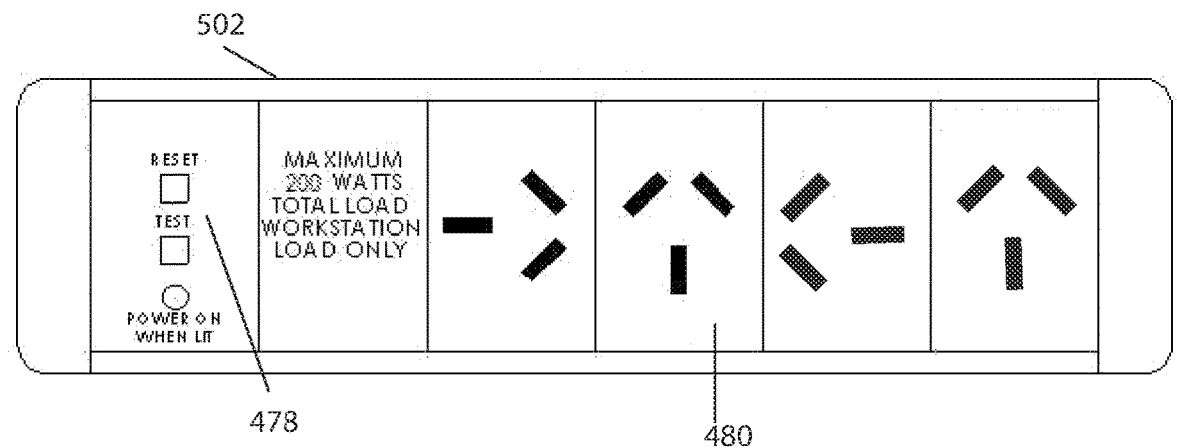
FIG. 12 is a front view of a single channel PDU for use with luminaires in the ceiling space.
Figure 13:
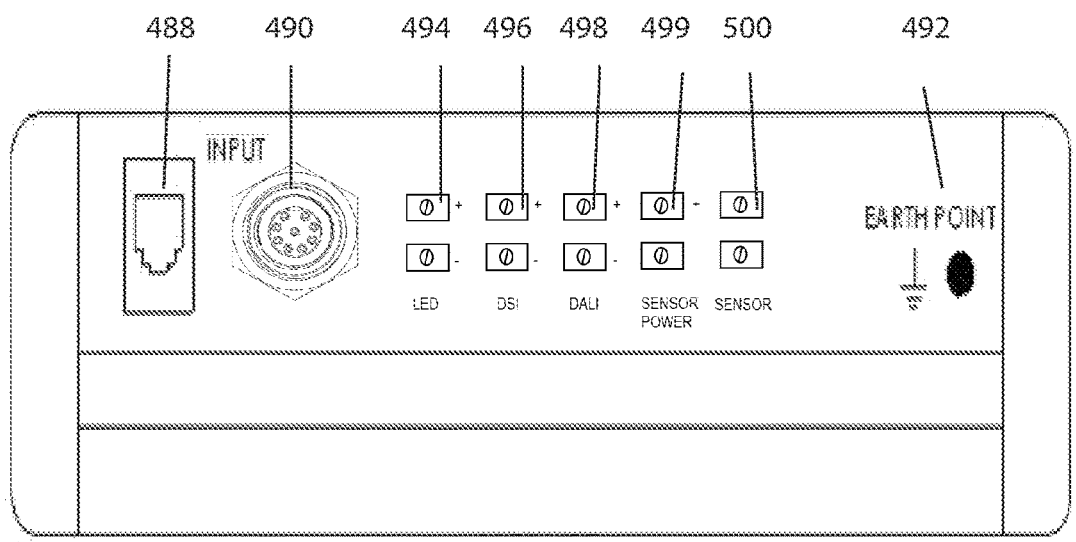
FIG. 13 is a rear view of the ceiling single channel PDU of FIG. 12.

Referring to FIGS. 12 and 13 these correspond with the lighting PDU's 88 from FIG. 1. They differ from the earlier two PDU's in that they lack Ethernet out and USB charging points. As these are only designed to service luminaires there is no need to have these components.

Figure 28:
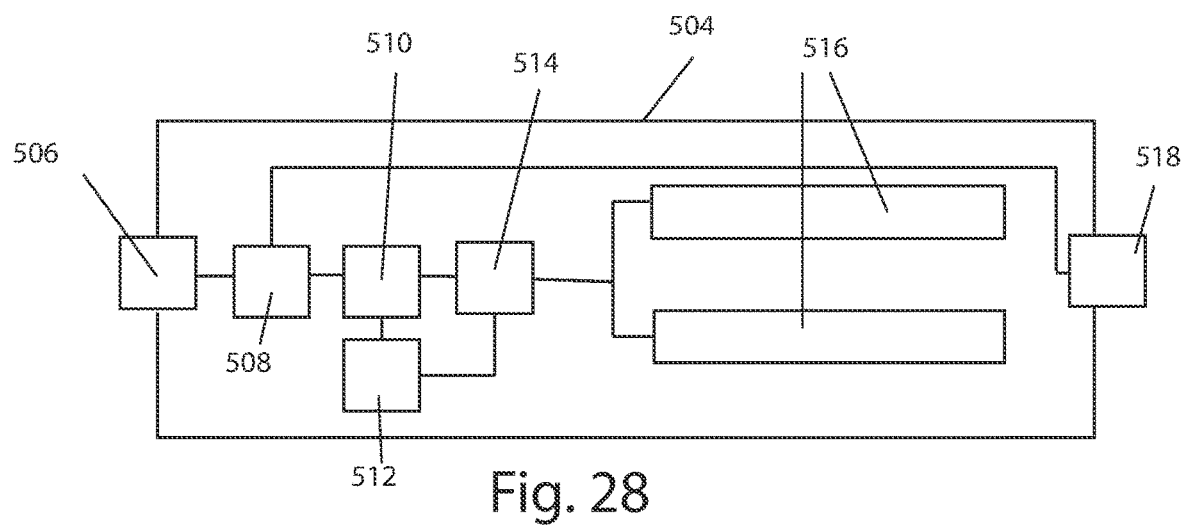
FIG. 28 is a LED luminaire which is powered by PoE and controlled by way of common mode signaling delivered over the PoE connection.
Figure 29:
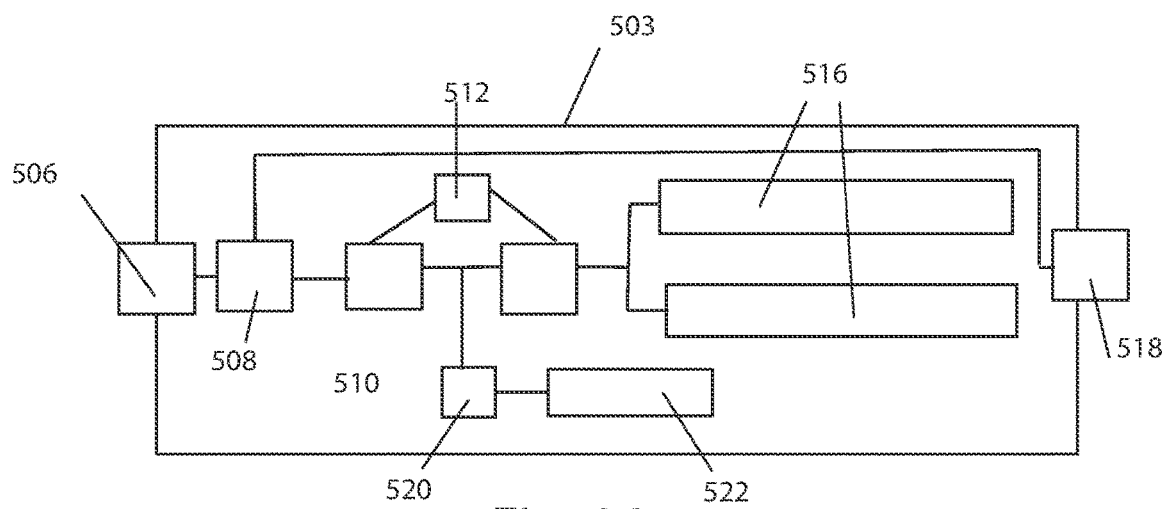
FIG. 29 is an emergency lighting LED luminaire which is powered by PoE and controlled by way of common mode signaling delivered over the PoE connection.

Reference is now made to FIGS. 28 and 29 which depict the LED daisy chainable luminaires 504 and 503 (102 and 104 from FIG. 1). These are the only PDU devices that have been presently disclosed without an inverter. They do however run on PoE connections which are introduced in RJ45 506 and the split/duplicated in T piece 508. One of the PoE connections is passed to PoE port output 518 for connecting the next luminaire. The other PoE connection is passed to PoE splitter 510 of the present invention as in the case of FIGS. 2 and 4 which have communications/signaling ability provided by microcontroller 512 which drives lighting module 514 which in turn drives LED strips 516. The luminaire in FIG. 29 contains, additionally, a charge controller 520 and battery 522 for keeping the LED strips on even in the event of power failure.

INDUSTRIAL APPLICABILITY

The present invention has applicability in the area of office fit outs, building construction and the provision of electrical, data and lighting services.

The invention claimed is:

1. A power distribution unit for outputting at least 110V of high voltage AC power, the power distribution unit comprising
    a POE Ethernet port to receive a CAT cable over which a POE connection to a POE power source is maintained, and wherein the POE connection is to provide at least 200 W of low voltage DC power from the POE power source;
    at least one additional POE Ethernet port to receive a respective at least one additional CAT cable over which a respective at least one additional POE connection is maintained, and wherein at least one of the at least one additional POE connection provides low voltage DC power;
    an inverter to receive a combination of the at least 200 W of low voltage DC power from the POE connection and the low voltage DC power from the at least one additional POE connection and to invert the received low voltage DC power to provide the at least 110V of high voltage AC power;
    an AC outlet to output the high voltage AC power; and
    at least one USB port to power USB powered devices, wherein the at least one USB port derives power from the POE connection, at least one of the at least one additional POE connection, or some combination thereof.

2. The power distribution unit of claim 1, wherein the POE connection is to provide up to 300 W of low voltage DC power from the POE power source.

3. The power distribution unit of claim 1, wherein the POE Ethernet port is further to receive networking signals from a network in conjunction with the low voltage DC power, and further comprising
    a splitter for splitting the networking signals and the low voltage DC power; and
    a network interface for connecting networkable devices to the network and providing the networking signals without any of the low voltage DC power to the networkable devices.

4. The power distribution unit of claim 3, wherein the network interface is one or more network Ethernet ports.

5. The power distribution unit of claim 3, wherein the network interface is a wireless communications module.

6. The power distribution unit of claim 1, wherein the AC outlet includes a soft wiring interface for connecting devices powered by AC power to the high voltage AC power.

7. The power distribution unit of claim 6, wherein the AC outlet further includes a plurality of general power outlets connected to the soft wiring interface.

8. The power distribution unit of claim 1, further comprising a battery for providing DC power to the inverter when the low voltage DC power provided to the inverter by the POE connection is insufficient to meet demand for power.

9. The power distribution unit of claim 1, further comprising an electrical connection to earth connected to the AC outlet such that the AC outlet provides a path to earth for use by an electrical device connected thereto.

10. The power distribution unit of claim 9, wherein the power distribution unit further comprises a ground connection lug for connecting the power distribution device to a local ground connection.

11. The power distribution unit of claim 9, wherein the POE Ethernet port is adapted to receive a RJ-45 plug and make a connection with a plug shield which is connected to a ninth conductor in the CAT cable, wherein the ninth conductor is used to carry a ground connection from the POE power source to the power distribution unit and provide the ground connection to the AC outlet.

12. The power distribution unit of claim 9, further comprising a residual current device (RCD) connected to the AC outlet, wherein the RCD monitors the AC outlet and disables the AC power from AC outlet when a power leak is detected by the RCD.

13. The power distribution unit of claim 1, wherein the inverter provides at least 800 W of the high voltage AC power.

14. A method of providing high voltage AC power to a remote site via a power distribution unit that includes two or more POE Ethernet ports, an inverter, an AC outlet, and at least one USB port, the method comprising:
    receiving, at each of the two or more POE Ethernet ports, a CAT cable over which a POE connection to a POE power source is maintained, wherein each POE connection is to provide low voltage DC power and at least one of the POE connections is to provide at least 200 W of low voltage DC power;
    receiving, at the inverter, a combination of the low voltage DC power from the POE connections and inverting the received low voltage DC power to provide at least 110V of high voltage AC power;
    outputting the at least 110V of high voltage AC power via the AC outlet, wherein the AC outlet comprises at least some subset of general power outlets and soft wiring interfaces;
    deriving USB power from the low voltage DC power received from at least one of the POE connections; and
    outputting the USB power via the at least one USB port to charge USB devices.

15. The method of claim 14, wherein the power distribution unit further includes a network interface and a splitter, and wherein the method further comprises provisioning networking connections to respective connected devices via the network interface.

16. The method of claim 15, wherein the provisioning includes receiving networking signals along with the low voltage DC power from the POE connection;

utilizing the splitter to split the networking signals from the low voltage DC power; and utilizing the network interface to provide the networking signals without any of the low voltage DC power to the respective connected devices.

17. The method of claim 16, wherein the network interface is at least one network Ethernet port to provide connectivity between the connected devices and the network.

18. The method of claim 14, wherein the power distribution unit further includes a battery, and wherein the method further comprises utilizing the battery to provide DC power to the inverter when the low voltage DC power provided by the POE connection is insufficient to meet demand for power.

19. The method of claim 14, wherein the power distribution unit further includes an electrical connection to earth connected to the AC outlet, and wherein the method further comprises providing a path to earth for use by an electrical device connected to the AC outlet.

20. The method of claim 19, wherein the power distribution unit further includes a residual current device, and wherein the method further comprises utilizing the residual current device to detect a leak in the high voltage AC power being output via the AC outlet; and shutting down the outputting of the high voltage AC power in the event a leak is detected.

21. The method of claim 19, wherein the power distribution unit further comprises a ground connection lug, and wherein the method further comprises connecting the power distribution unit to a local ground connection via the ground connection lug.

22. The method of claim 19, wherein the POE Ethernet port is adapted to receive an RJ-45 plug and make a connection with a plug shield which is connected to a ninth conductor in the CAT cable used to carry a ground connection from the POE power source to the power distribution unit, and wherein the method further comprises conducting the ground connection to the AC outlet.

23. A power distribution unit for outputting at least 110V of high voltage AC power, the power distribution unit comprising a plurality of POE Ethernet ports, wherein each of the plurality of POE Ethernet ports is to receive a respective CAT cable over which a respective POE connection to a POE power source is maintained, wherein at least a subset of the POE connections is to provide low voltage DC power, and wherein at least one of the POE connections is to provide at least 200 W of low voltage DC power;

an inverter to receive a combination of the low voltage DC power from the respective POE connections and to invert the received low voltage DC power to provide the at least 110V of high voltage AC power;

an AC outlet to provide the at least 110V of high voltage AC power to devices connected thereto; and at least one USB port to power USB powered devices, wherein the at least one USB port derives power from at least one of the POE connections.

24. The power distribution unit of claim 23, further comprising an electrical connection to earth connected to the AC outlet such that the AC outlet provides a path to earth for use by an electrical device connected thereto.

25. The power distribution unit of claim 24, further comprising a residual current device (RCD) connected to the AC outlet, wherein the RCD monitors the AC outlet and disables the AC power from AC outlet when a power leak is detected by the RCD.

\* \* \* \* \*